(12) United States Patent
Mosko

(10) Patent No.: US 9,473,576 B2
(45) Date of Patent: Oct. 18, 2016

(54) SERVICE DISCOVERY USING COLLECTION SYNCHRONIZATION WITH EXACT NAMES

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 218 days.

(21) Appl. No.: 14/247,140

(22) Filed: Apr. 7, 2014

(65) Prior Publication Data

US 2015/0288754 A1    Oct. 8, 2015

(51) Int. Cl.
*H04L 29/08* (2006.01)
*H04L 9/32* (2006.01)

(52) U.S. Cl.
CPC .......... *H04L 67/1095* (2013.01); *H04L 67/16* (2013.01); *H04L 9/3239* (2013.01)

(58) Field of Classification Search
CPC . H04L 67/1095; H04L 67/16; H04L 9/3239; G06F 17/30174; G06F 8/65; G06F 17/30345
See application file for complete search history.

(56) References Cited

U.S. PATENT DOCUMENTS

| | | | |
|---|---|---|---|
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,214,702 A | 5/1993 | Fischer | |
| 5,377,354 A | 12/1994 | Scannell | |
| 5,629,370 A | 5/1997 | Freidzon | |
| 5,845,207 A | 12/1998 | Amin | |
| 5,870,605 A | 2/1999 | Bracho | |
| 6,052,683 A | 4/2000 | Irwin | |
| 6,085,320 A | 7/2000 | Kaliski, Jr. | |
| 6,091,724 A | 7/2000 | Chandra | |
| 6,128,623 A | 10/2000 | Mattis | |
| 6,128,627 A | 10/2000 | Mattis | |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Wetherall, David, "Active Network vision and reality: Lessons form a capsule-based system", ACM Symposium on Operating Systems Principles, Dec. 1, 1999. pp. 64-79.

(Continued)

*Primary Examiner* — Chirag R Patel
(74) *Attorney, Agent, or Firm* — Shun Yao; Park, Vaughan, Fleming & Dowler LLP

(57) ABSTRACT

One embodiment provides a system that facilitates service discovery based on the synchronization of manifests between devices in a content centric network by using a synchronization protocol based on exact match names. During operation, a local receives an advertisement corresponding to a remote manifest of a remote device. A manifest represents a collection of service records, and the advertisement includes a service record corresponding to the remote device. The local device updates its local manifest, in response to determining that the local manifest and the remote manifest correspond to a same namespace, by inserting the advertised service record into the local manifest.

25 Claims, 19 Drawing Sheets

(56) References Cited

U.S. PATENT DOCUMENTS

| | | |
|---|---|---|
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 * | 3/2015 | Gaither .................. 717/170 |
| 8,977,596 B2 * | 3/2015 | Montulli ........... G06F 17/30174 707/640 |
| 9,002,921 B2 | 4/2015 | Westphal |
| 9,112,895 B1 | 8/2015 | Lin |
| 9,253,087 B2 | 2/2016 | Zhang |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |

(56) References Cited

U.S. PATENT DOCUMENTS

| | | |
|---|---|---|
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0051055 A1 | 3/2006 | Ohkawa |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0250006 A1 | 10/2008 | Dettinger |
| 2008/0256138 A1 | 10/2008 | Sim-Tang |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0077184 A1 | 3/2009 | Brewer |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |

(56) References Cited

U.S. PATENT DOCUMENTS

| | | |
|---|---|---|
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0281263 A1 | 11/2010 | Ugawa |
| 2010/0284309 A1 | 11/2010 | Allan |
| 2010/0284404 A1 | 11/2010 | Gopinath |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1* | 6/2013 | Bhullar ............ G06F 17/30887 717/173 |
| 2013/0163426 A1 | 6/2013 | Beliveau |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0146819 A1 | 5/2014 | Bae |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |

(56) References Cited

U.S. PATENT DOCUMENTS

| | | | |
|---|---|---|---|
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0298248 A1 | 10/2014 | Kang | |
| 2014/0314093 A1 | 10/2014 | You | |
| 2014/0337276 A1 | 11/2014 | Iordanov | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0033365 A1 | 1/2015 | Mellor | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095514 A1 | 4/2015 | Yu | |
| 2015/0120663 A1 | 4/2015 | LeScouarnec | |
| 2015/0169758 A1 | 6/2015 | Assom | |
| 2015/0188770 A1 | 7/2015 | Naiksatam | |
| 2015/0195149 A1 | 7/2015 | Vasseur | |
| 2015/0207633 A1 | 7/2015 | Ravindran | |
| 2015/0207864 A1* | 7/2015 | Wilson | G06F 21/121 709/203 |
| 2015/0279348 A1 | 10/2015 | Cao | |
| 2015/0349961 A1 | 12/2015 | Mosko | |
| 2015/0372903 A1 | 12/2015 | Hui | |
| 2015/0381546 A1 | 12/2015 | Mahadevan | |
| 2016/0021172 A1 | 1/2016 | Mahadevan | |

FOREIGN PATENT DOCUMENTS

| | | | |
|---|---|---|---|
| EP | 0295727 | A2 | 12/1988 |
| EP | 0757065 | A2 | 7/1996 |
| EP | 1077422 | A2 | 2/2001 |
| EP | 1384729 | A1 | 1/2004 |
| EP | 2120402 | | 11/2009 |
| EP | 2120419 | | 11/2009 |
| EP | 2124415 | A2 | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |
| WO | 2013123410 | | 8/2013 |

OTHER PUBLICATIONS

Kulkarni A.B. et al., "Implementation of a prototype active network", IEEE, Open Architectures and Network Programming, Apr. 3, 1998, pp. 130-142.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

D. Boneh and M. Franklin. Identity-Based Encryption from the Weil Pairing. Advances in Cryptology—CRYPTO 2001, vol. 2139, Springer Berlin Heidelberg (2001).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer Sciencevol. 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

S. Chow, J. Weng, Y. Yang, and R. Deng. Efficient Unidirectional Proxy Re-Encryption. Progress in Cryptology —AFRICACRYPT 2010. Springer Berlin Heidelberg (2010).

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

(56) References Cited

OTHER PUBLICATIONS

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

(56) References Cited

OTHER PUBLICATIONS

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE Infocom 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.

(56) References Cited

OTHER PUBLICATIONS

Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Koponen, Teemu et al., "A Data-Oriented (and Beyond) Network Architecture", SIGCOMM '07, Aug. 27-31, 2007, Kyoto, Japan, XP-002579021, p. 181-192.
C. Gentry and A. Silverberg. Hierarchical ID-Based Cryptography. Advances in Cryptology—ASIACRYPT 2002. Springer Berlin Heidelberg (2002).
Xiong et al., "CloudSeal: End-to-End Content Protection in Cloud-based Storage and Delivery Services", 2012.
https://code.google.com/p/ccnx-trace/.
Mahadevan, Priya, et al. "Systematic topology analysis and generation using degree correlations." ACM SIGCOMM Computer Communication Review. vol. 36. No. 4. ACM, 2006.
Zahariadis, Theodore et al. "Trust management in wireless sensor networks." European Transactions on Telecommunications 21.4 (2010): 386-395.
Biradar et al., "Review of multicast routing mechanisms in mobile ad hoc networks", Aug. 16, Journal of Network and Computer Applications 35 (2012) 221-229.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011, pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric Centric VANETs", University "Mediterranea" of Reggio Calabria, Jun. 15, 2013.

\* cited by examiner

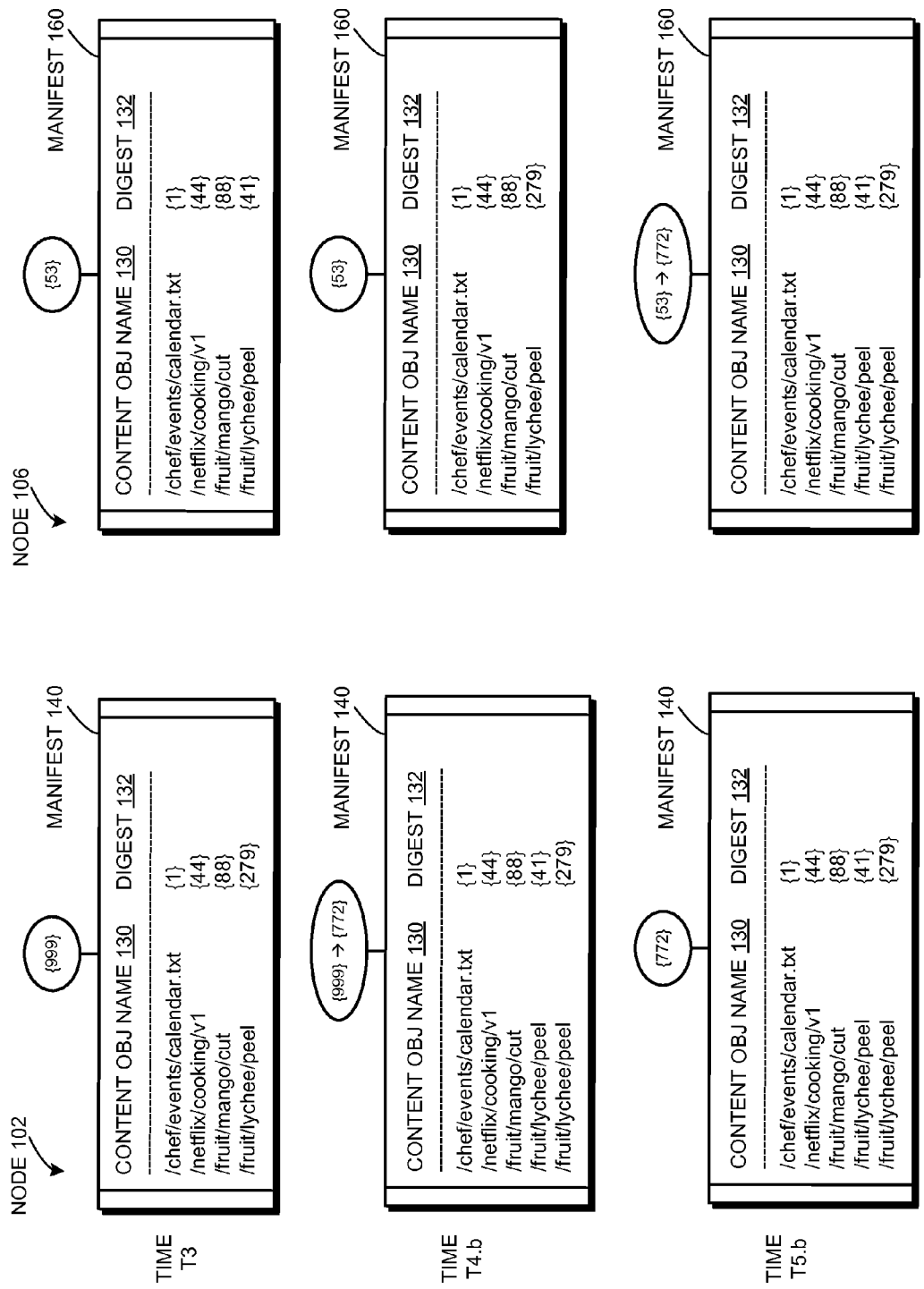

SERVICE DISCOVERY USING COLLECTION SYNCHRONIZATION WITH EXACT NAMES

BACKGROUND

1. Field

This disclosure is generally related to data synchronization. More specifically, this disclosure is related to service discovery by executing synchronization of collections between peers on a network using exact match names.

2. Related Art

In many computing applications, it is often important for peers on a network to synchronize their respective collections of data. The proliferation of digital content creates a vast number of collections which require reconciliation. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified based on a unique name, which is typically a hierarchically structured variable length identifier (HSVLI) which comprises contiguous name components ordered from a most general level to a most specific level.

A current CCN synchronization protocol uses a longest-prefix match method, where an interest in "/parc/events/" will match both "/parc/events/calendar.txt" and "/parc/events/conference.txt." This current synchronization protocol is based on responses that extend the name of an interest. This synchronization protocol is described in the following applications:

U.S. patent application Ser. No. 13/720,736, entitled "DYNAMIC ROUTING PROTOCOLS USING DATABASE SYNCHRONIZATION," by inventors Van L. Jacobson and Marc E. Mosko, filed 19 Dec. 2012 (hereinafter "U.S. patent application Ser. No. 13/720,736"); and U.S. patent application Ser. No. 13/681,306, entitled "DATA TRANSPORT BY NAMED CONTENT SYNCHRONIZATION," by inventors Van L. Jacobson and Marc E. Mosko, filed 19 Nov. 2012 (hereinafter "U.S. patent application Ser. No. 13/681,306");

the disclosures of which are herein incorporated by reference in their entirety.

As CCN architectures evolve, there is a need to discover devices and services offered by those devices based on a synchronization protocol that allows the use of exact name match, rather than the current longest-prefix match. In such a new architecture, the current CCN synchronization protocol will not work.

SUMMARY

One embodiment provides a system that facilitates service discovery based on the synchronization of manifests between devices in a content centric network by using a synchronization protocol based on exact match names. During operation, a local device receives an advertisement corresponding to a remote manifest of a remote device. A manifest represents a collection of service records, and the advertisement includes a service record corresponding to the remote device. The local device updates its local manifest, in response to determining that the local manifest and the remote manifest correspond to a same namespace, by inserting the advertised service record into the local manifest.

In some embodiments, the local device transmits a query for an advertisement corresponding to a remote manifest of a remote device.

In some embodiments, the local device transmits an advertisement corresponding to the local manifest of the local device, and the advertisement includes the service record corresponding to the local device.

In some embodiments, the local device receives a query from a remote device for an advertisement corresponding to the local manifest, and the advertisement includes the service record corresponding to the local device.

In some embodiments, a packet sent or received by the local device indicates one or more of: a routable prefix that identifies the manifest; an identifier to determine that the packet corresponds to a transfer of data; an identifier to determine that the packet corresponds to an advertisement of data; a root hash value of the manifest; a name of a service record in the manifest; and a service record.

In some embodiments, responsive to determining that a serial number of the service record of an advertisement is greater than a serial number of the service record in the local manifest that has a same name as the service record of the advertisement, the local device updates the value of the service record in the local manifest with the value of the service record of the advertisement.

In some embodiments, the local device initializes onto a network, without a manifest. The local device creates a service record corresponding to the local device and creates a manifest for the local device comprised of the service record.

In some embodiments, the local device sends a request for the remote manifest in response to determining that a root hash value of the local manifest is different from a root hash value of the advertised remote manifest, where a root hash value identifies service records of a manifest. Based on the received remote manifest, the local device determines which service records represented in the remote manifest are different from the service records represented in the local manifest. The local device transmits a set of interests for the service records that are different.

In some embodiments, responsive to the occurrence of a time to live (TTL) of a service record in the local manifest, the local device updates the local manifest by deleting the expired service record from the local manifest. The local device transmits an advertisement corresponding to the updated local manifest.

BRIEF DESCRIPTION OF THE FIGURES

FIG. 6D presents tables depicting the format of two manifests during synchronization, where the digest of a same named content object in the local manifest is different from the digest in the remote manifest, and where the local node advertises its manifest, in accordance with an embodiment of the present invention.

In the figures, like reference numerals refer to the same figure elements.

DETAILED DESCRIPTION

Figure 1:
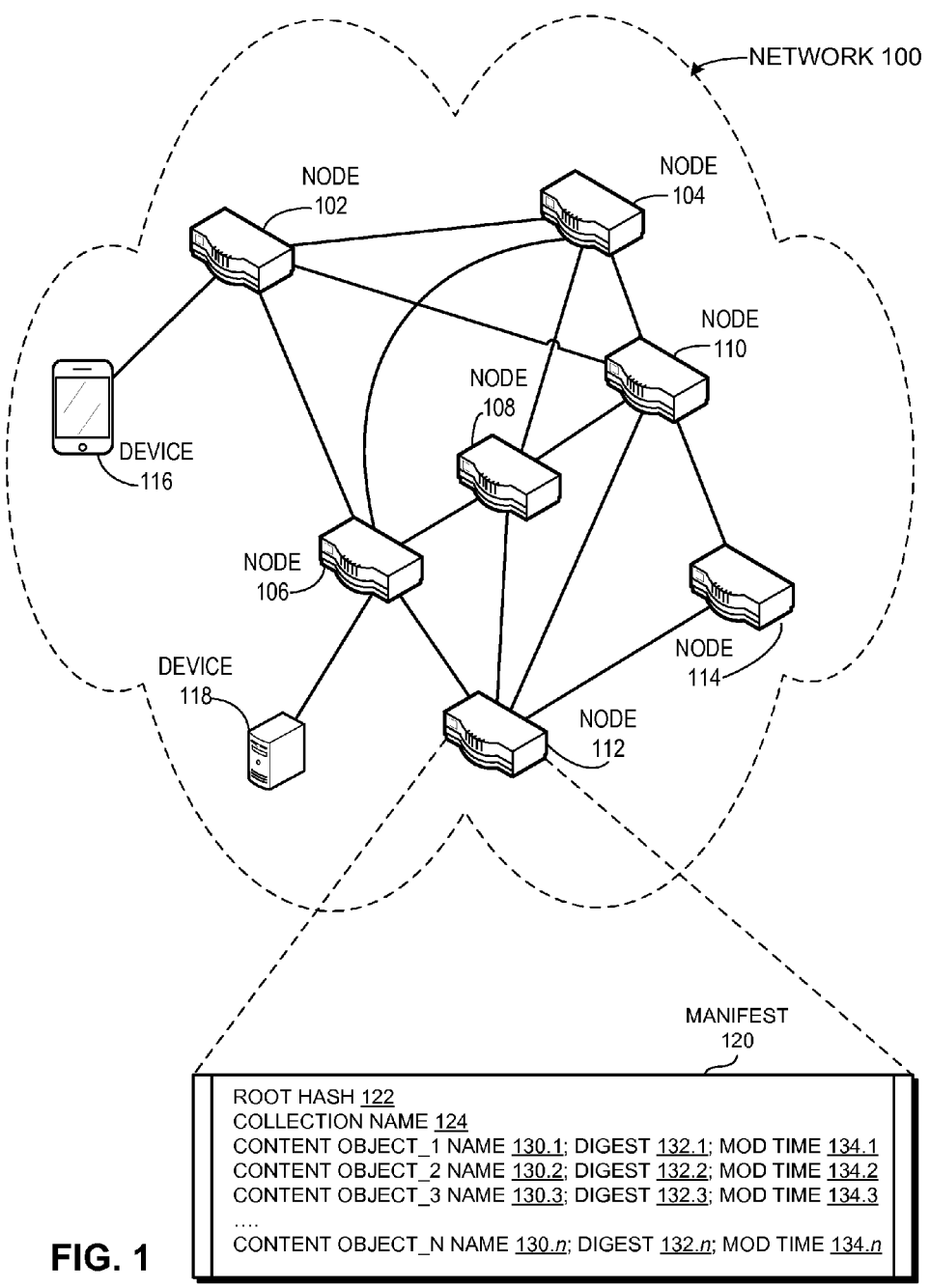
FIG. 1 illustrates an exemplary computer system that facilitates synchronization of manifests between nodes in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates the discovery of devices and services offered by those devices in a content centric network (CCN), based on the synchronization of manifests between nodes on a network by using exact match names. In the following description of embodiments of the present invention, the relevant CCN entities are a local node and a remote node, although the roles can be reversed. In some embodiments, the relevant CCN entities are a device at a local node ("local device") and a device at a remote node ("remote node"). Each of the local and remote nodes or devices is associated with a manifest, which represents a collection of content objects at a node. A manifest is identified by a specific prefix, such that two manifests with the same prefix correspond to the same collection of content objects.

In some embodiments, the manifest is an ordered list identifying a collection of content objects. Each content object in a collection is identified by its name and corresponding digest, where the digest is the hash value of the content object. In some embodiments, each content object is also identified by a modified time which indicates the time that the content was modified. For the purposes of this description, the manifest is described as an ordered list, but other embodiments include the manifest structured as a synchronization tree, which contains content objects as well as nested collections of content objects. The system generates a root hash value for the manifest. The root hash value is an additive hash value based on the hash values of the individual content objects of the collection. The root hash value of the manifest is a unique identifier for the manifest.

The system can synchronize the collections in a local manifest with the contents in a local manifest using exact match names. A remote node advertises a hash of its manifest. A local node receives the advertisement and determines that the advertised remote manifest corresponds to a local manifest, where the remote manifest and the local manifest correspond to the same collection of content objects. The local node determines whether the contents of the local manifest are synchronized with the contents of the remote manifest by comparing the root hash value of the local manifest with the root hash value of the remote manifest. If they do not match, then the local node retrieves the remote manifest by sending a request for the remote manifest to the remote node. In some embodiments, the local node sends a set of interests based on a chunking protocol, and each interest corresponds to a numbered chunk of the manifest. In some embodiments, the remote node can advertise the number of chunks corresponding to its manifest. The local node, in possession of the remote manifest, determines which content objects indicated in the remote manifest are different from the content objects indicated in the local manifest. Subsequently, the local node transmits a set of interests for the content objects that are different, where the interest includes the name of the requested content object. In some embodiments, the interest also includes the corresponding hash value of the requested content object. In this manner, the system uses an exact name match to request and receive the set of different content objects.

In some embodiments, the manifest is transmitted using a structured technique, such as the rolling hash technique in the rsync protocol, rather than sending the complete manifest.

In some embodiments, a content object in a collection is further identified by a corresponding modified time, which indicates the time the content object was modified. For each content object that is determined to be different, the local node determines whether the modified time of the content object in the remote manifest is more or less recent than the corresponding content object in the local manifest. If the remote content object corresponds to a more recent version, then the local node updates the value of the content object in the local manifest with the value of the content object from the remote manifest. A description of how to remove, or "white-out", a content item from a data collection is contained in U.S. patent application Ser. No. 13/681,306, previously incorporated by reference.

In some embodiments, the name of the content object is a hierarchically structured variable length identifier (HSLVI) and indicates a version number or timestamp or implicit sort order, which is used in lieu of a modified time in the manifest to determine the most recent version of a content object.

In some embodiments, if the remote content object corresponds to a version that is less recent, the system can determine whether to retain the history by inserting the value of the content object from the remote manifest in a history field of the corresponding content object in the local manifest. The system updates the values accordingly for each content object that is determined to be different. In this manner, the system synchronizes the manifest at a local node with the manifest at a remote node.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338, 175 (entitled "CONTROLLING THE SPREAD OF INTERESTS AND CONTENT IN A CONTENT CENTRIC NETWORK," by inventors Van L. Jacobson and *Diana* K. Smetters, filed 18 Dec. 2008), which is hereby incorporated by reference.

Exemplary Network and Manifest

FIG. 1 illustrates an exemplary network 100 that facilitates the synchronization of manifests between nodes in a content centric network (CCN), in accordance with an embodiment of the present invention. Network 100 can include a client device 116, a content producing device 118, and a router or other forwarder at nodes 102, 104, 106, 108, 110, 112, and 114. Nodes 102-114 can each contain one or more manifests. For example, node 112 contains a manifest 120. Manifest 120 comprises a collection name 124 and an ordered list of content objects identified by one or more of the following: a content object name 130.1-130.$n$; a digest 132.1-132.$n$, and a modified time 134.1-134.$n$. The digests 132.1-132.$n$ comprise a hash value of the content object identified respectively by names 130.1-130.$n$. The digest can be a SHA-256 hash of the content object, where the likelihood of a hash collision (where the one-way hash of two different content objects results in the same value) is sufficiently low such that the digest is a unique identifier for the content object. Manifest 120 also includes a root hash 122, which is an additive hash value based on the hash values 132.1-132.$n$ of the individual content objects of the collection. Root hash 122 is a unique identifier for manifest 120 and represents the content objects in the collection.

In some embodiments, a manifest indicates a name and a corresponding digest, but does not indicate a modified time. Such a system can include, e.g., a file server where prior versions of a text file are important and thus retained by the system. In other embodiments, a manifest indicates a name, a corresponding digest, and a modified time. The system can use the modified time to determine which version of the content item should be retained. For example, if the content items indicate a link state, then the system does not need information relating to previous versions. In this case, only the content object with the most recent modified time is retained.

Any two nodes in a network can contain a manifest that represents the same collection of data, where the manifests can be synchronized using the methods described herein. The terms "local node" and "remote node" can apply to any node in a content-centric network (CCN) and are used in this disclosure to differentiate between two nodes in a CCN.

Structure of Names

The synchronization of manifests representing the same collection of data between two nodes is based on a three part name. The first part is a routable prefix that identifies the collection, such as "/a/b." The second part contains an identification of the relevant name space, and is either "/adv" for advertisements or "/data" for data transfers. The third part is the hash value or content being advertised or transferred. Thus, a CCN name is of the form:

/collection_prefix/adv_or_data/protocol_data

An example of an interest sending a hash advertisement is:

/a/b/adv/<roothash>

A local node receiving this advertisement and containing a local manifest with the same routable prefix "/a/b" retrieves the advertised manifest in chunks 0, 1, . . . up to the ending chunk number m based on a chunking protocol. Such an interest looks like:

/a/b/data/<roothash>/<chunk number>

Based on the entries in the retrieved manifest, the system determines which content objects identified in the retrieved manifest are different from the content objects identified in the local manifest. The system retrieves the different content objects based on the name of the content object:

/a/b/data/<name of content object>

In some embodiments, the system retrieves the different content objects based on the hash value of the requested content object:

/a/b/data/<hash(content object)>

In some embodiments, the system retrieves the different content objects based on the name in the manifest. This technique allows the system to retrieve any cached copy of the object rather than using the name of the content under the collection's namespace. For example, to retrieve the first item from Manifest 140 in FIG. 6B, the system would send an Interest for the name and digest:

/chef/events/calendar.txt,digest={1}

Communication and Synchronization of Manifests Between Two Nodes

Figure 2:
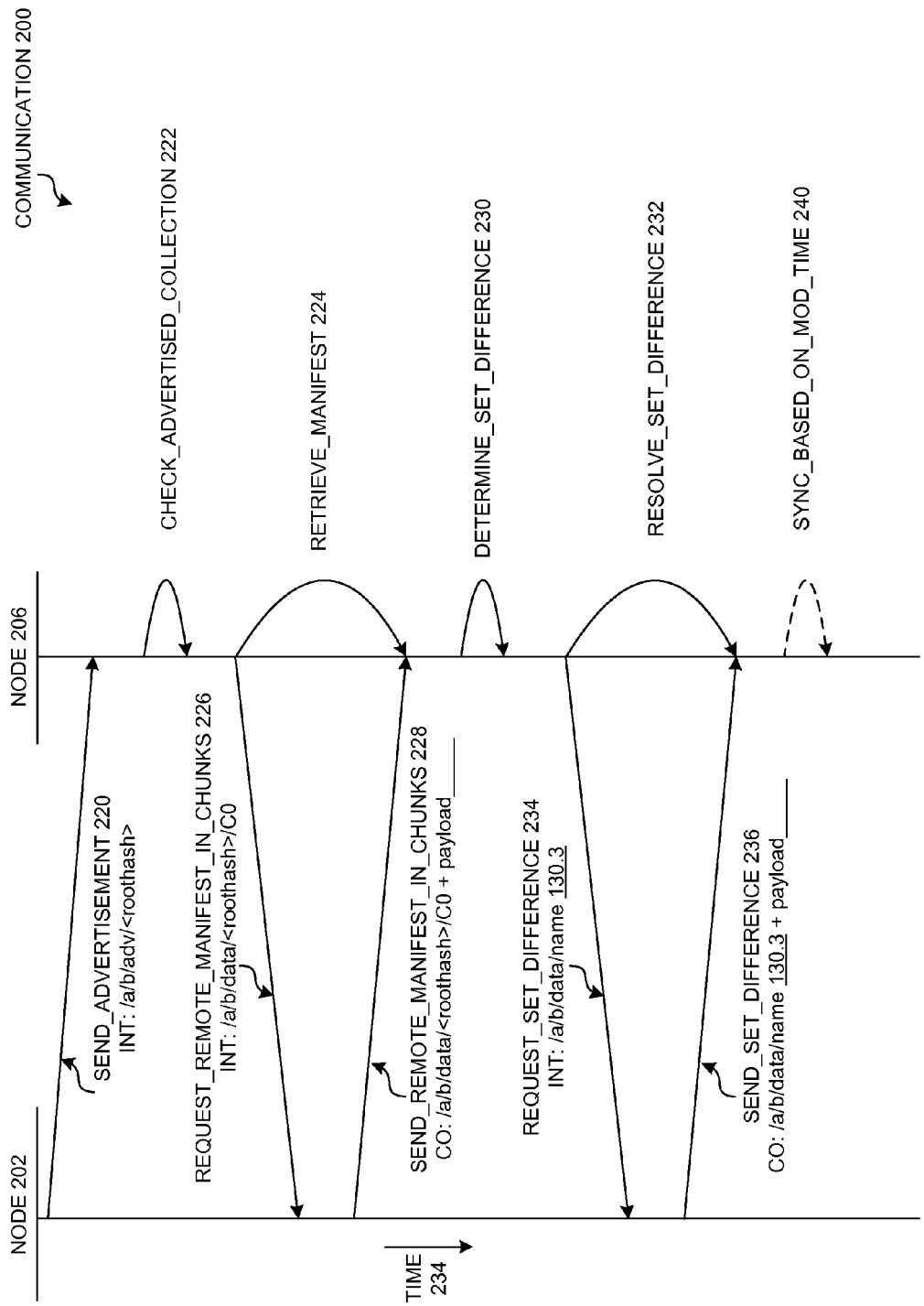
FIG. 2 illustrates exemplary communication between a local node and a remote node, in accordance with an embodiment of the present invention.

FIG. 2 illustrates an exemplary communication 200 between a node 202 (remote node) and a node 206 (local node), in accordance with an embodiment of the present invention. Node 202 and node 206 each contain a manifest with the same routing prefix, or collection name, "/a/b." Remote node 202 transmits a send_advertisement interest 220, which is a hash advertisement containing the root hash value of its manifest identified by collection name "/a/b." The interest takes the form: "/a/b/adv/<roothash>." Local node 206 receives the advertised interest and performs a check_advertised_collection procedure 222 to determine if node 206 contains a manifest indicating a same collection as the advertised manifest, based on the same collection prefix ("/a/b"). Then, local node 206 determines if the root hash of its local manifest is different from the root hash of the remote manifest. Differing hash values indicate that the collections need to be synchronized with each other. Local node 206 then performs a retrieve_manifest procedure 224, by sending a set of interests for the manifest. The set of interests is divided into chunks based on a chunking protocol. The interests are sent in a request_manifest_in_chunks message 226, and are of the form: "/a/b/datakroothash>/C0", "/a/b/datakroothash>/C1," "/a/b/datakroothash>/C2," etc., where "C0" represents the first chunk of the manifest, and so on. In some embodiments, the advertising node can include the number of chunks required to transfer its manifest. In a send_manifest_in_chunks message 228, remote node 202 sends the requested manifest back in response to the set of interests. The requested content objects take the form: "/a/b/datakroothash>/C0+payload" where the payload contains the requested chunk of the manifest.

Local node 206, in possession of the remote manifest, performs a determine_set_difference procedure 230. In some embodiments, the result of this procedure is a list of content objects identified by name. In other embodiments, the result is a list of content objects identified by their corresponding digest. Local node 206 then transmits a request_set_difference interest 234 for each content object determined to be different. The interest takes the form, e.g.: "/a/b/data/name 130.3". Local node 206 receives the requested content object when remote node 202 transmits a send_set_difference content object 236, where the requested content object takes the form: "/a/b/data/name 130.3+payload." Thus, local node 206 requests and receives all content objects determined to be different such that the contents of the local manifest are synchronized with the contents of the remote manifest. In some embodiments, local node 206 performs a sync_based_on_mod_time procedure 240, which is described below in relation to FIG. 4.

Figure 3:
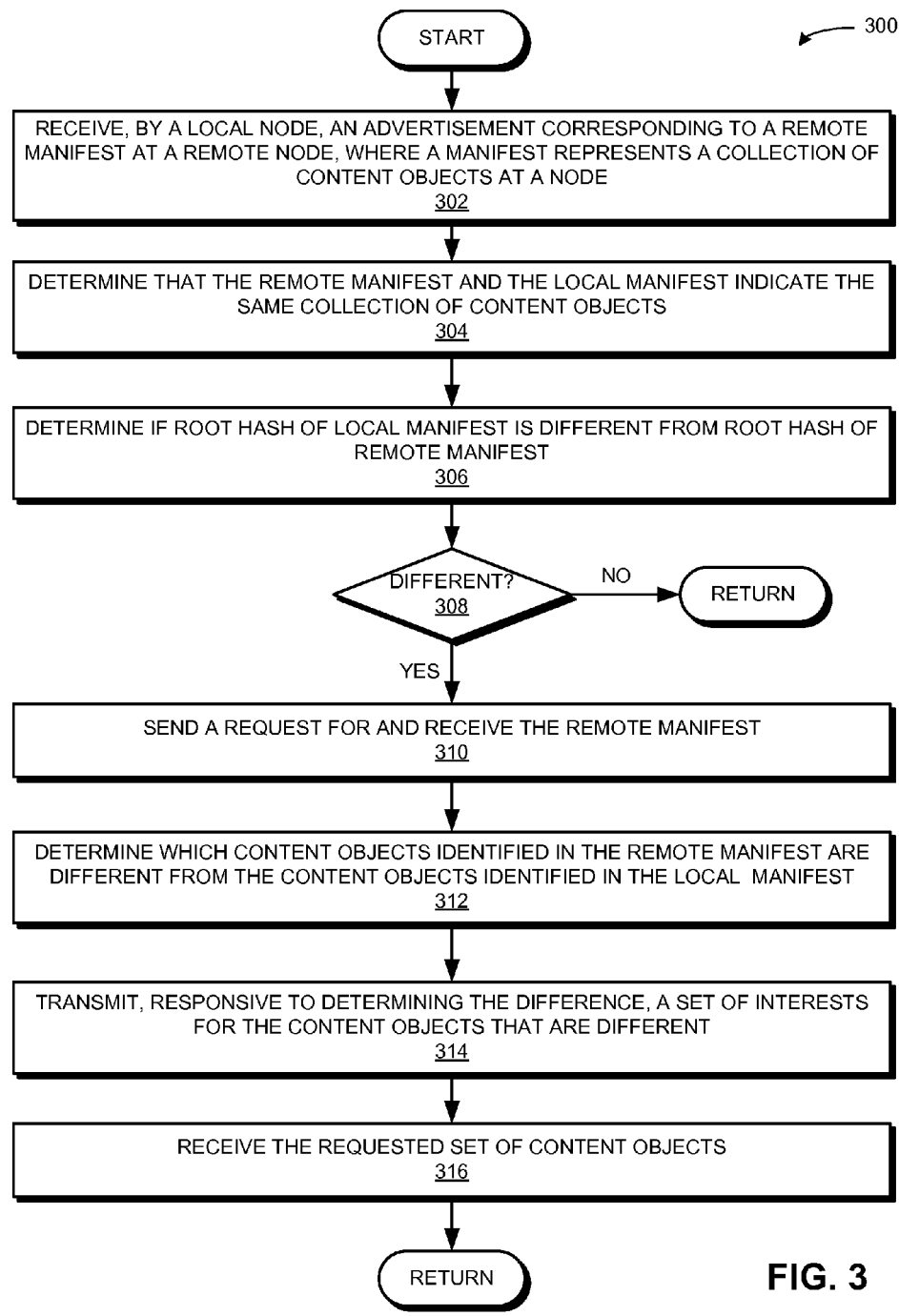
FIG. 3 presents a flow chart illustrating a method for synchronizing content associated with a remote manifest and a local manifest, in accordance with an embodiment of the present invention.

FIG. 3 presents a flow chart 300 illustrating a method for synchronizing content associated with a remote manifest and a local manifest, in accordance with an embodiment of the present invention. In the below description, the local node is depicted as node 106 in FIG. 2 and the remote node is depicted as node 102 in FIG. 2. A local node receives an advertisement corresponding to a remote manifest at a remote node (operation 302). A manifest represents a collection of content objects at a node. The local node determines that the remote manifest and the local manifest indicate the same collection of content objects (operation 304, corresponding to check_advertised_collection procedure 222 in FIG. 2). In some embodiments, the local node determines if the manifests indicate the same collection by comparing the collection name, or routing prefix, of the manifests. The local node then determines if the root hash value of its local manifest is different from the root hash value of the remote manifest (operation 306). The root hash value of a manifest is a unique identifier for the manifest, and comprises an additive hash value of the digests of the content objects represented in the manifest. If the root hash value of the local manifest is the same (decision 308), then the procedure returns.

If the root hash value of the local manifest is not the same as the root hash value of the remote manifest (decision 308), this indicates that the local and remote manifests, which represent the same collection, are not synchronized and need to be reconciled. The local node downloads or transfers the remote manifest by sending a request for, and receiving in response to the request, the remote manifest (operation 310, corresponding to retrieve_manifest procedure 224 in FIG. 2).

The local node determines which content objects identified in the remote manifest are different from the content objects identified in the local manifest (operation 312, corresponding to the determine_set_difference operation 230 in FIG. 2). In some embodiments, the local node determines the set difference by comparing the digests of the content objects identified in the local manifest with the digests of the same named content objects identified in the remote manifest. The local node transmits a set of interests corresponding to the determined different set of content objects (operation 234), and receives the requested content objects in return (operation 236). This corresponds to the resolve_set_difference operation 232 shown in FIG. 2. Thus, the contents of the local manifest are synchronized with the contents of the remote manifest.

If the local node has changes, the local node advertises the new root hash value. It can do so immediately, or schedule a next advertisement based on network or other timing considerations. For example, the local system can advertise its root hash at least once per second, but no more than four times a second. Therefore, during reconciliation, as the root hash changes due to updates, the system can advertise up to four changes per second. Otherwise, in a steady state, it can advertise once per second.

Synchronization Based on Modified Time

Figure 4:
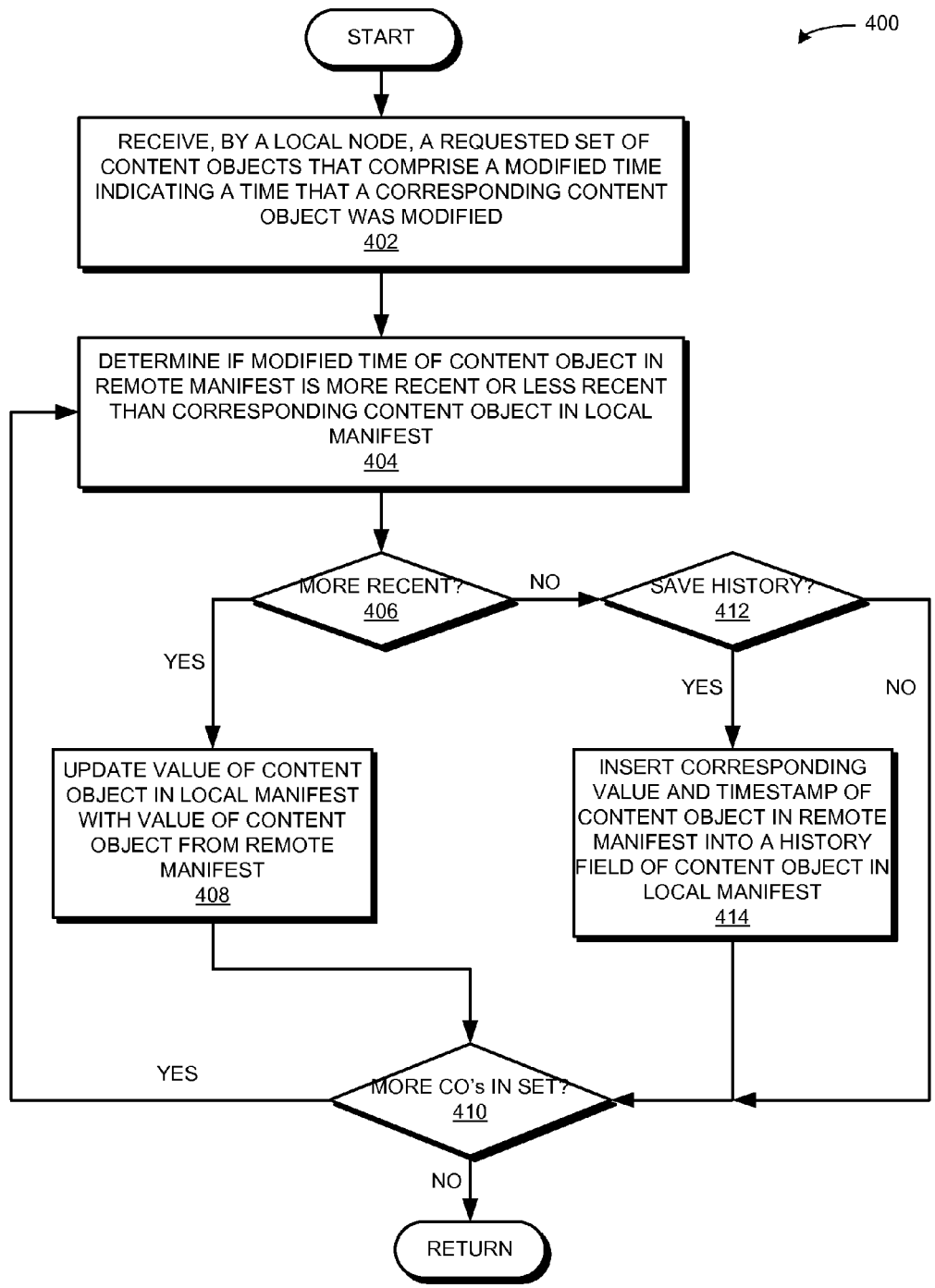
FIG. 4 presents a flow chart illustrating a method for synchronizing content associated with a remote manifest and a local manifest based on a modified time, in accordance with an embodiment of the present invention.

FIG. 4 presents a flow chart 400 illustrating a method for synchronizing content associated with a remote manifest and a local manifest based on a modified time, in accordance with an embodiment of the present invention. Note that the synchronization of content can also be based on a sequence number associated with a content object, where a greater sequence number indicates a more recent version of the content object. Synchronization of content can also be based on an ordering of the names of the content objects, where an implicit sort order indicates a more recent version of the content object. Flowchart 400 illustrates an exemplary method based on the modified time of a content object, which is depicted as sync_based_on_mod_time operation 240 in FIG. 2. Based on the previously determined set difference, a local node receives a requested set of content objects that include a modified time indicating a time that a corresponding content object was modified (operation 402). For each content object, the local node determines if the modified time of the content object in the remote manifest is more recent or less recent than the corresponding content object in the local manifest (operation 404). If the modified time of the content object from the remote manifest is more recent (decision 406), then the system updates the value of the content object in the local manifest with the value of the content object from the remote manifest (operation 408). In some embodiments, the local node can determine whether to retain the value of its (less recent) content object in the local manifest, by inserting a corresponding value and modified time of the (less recent) content object into a history field in the local manifest before updating the value of the content object in the local manifest. If there are more content objects in the set that need to be retrieved (decision 410), then the system returns to operation 404. If not, then the system has finished retrieving the necessary content objects.

If the modified time of the content object from the remote manifest is less recent than the corresponding content object in the local manifest (operation 406), then the system determines whether to save the value of the (less recent) content object from the remote manifest (decision 412), by inserting a corresponding value and modified time of the (less recent) content object into a history field in the local manifest (operation 414). If there are more content objects in the set that need to be retrieved (decision 410), then the system returns to operation 404. If not, then the system has finished retrieving the necessary content objects. Thus, all content objects determined to be different have been updated, and possibly retained or saved in a history field of the local manifest, such that the contents of the local manifest are synchronized with the contents of the remote manifest.

Transmitting Advertisement, Manifest, and Contents for Synchronization

Figure 5:
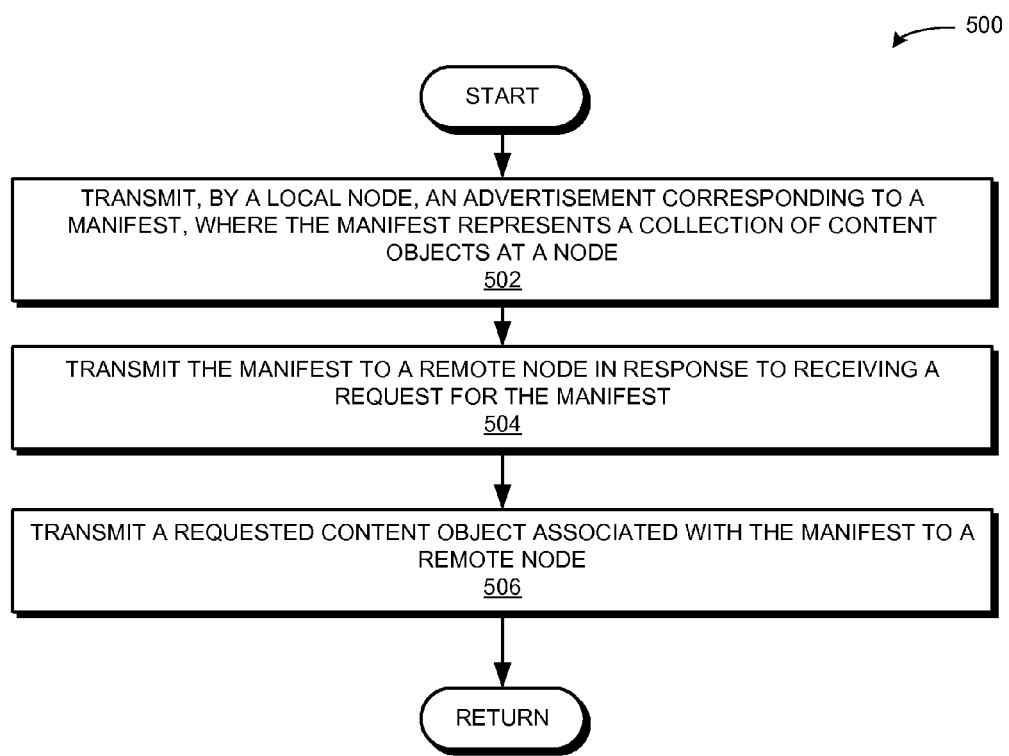
FIG. 5 presents a flow chart illustrating a method for transmitting an advertisement corresponding to a manifest, in accordance with an embodiment of the present invention.

FIG. 5 presents a flow chart 500 illustrating a method for transmitting an advertisement corresponding to a manifest, in accordance with an embodiment of the present invention. The node in FIG. 5 is described as a local node because it transmits packets to a remote node. Note that the local node in FIG. 5 corresponds to node 202 in FIG. 2, which has been previously referred to as remote node 202. Recall that any node in a network such as a content-centric network (CCN) can be referred to as a remote node or a local node.

A local node transmits an advertisement corresponding to a manifest, where the manifest represents a collection of content objects at a node (operation 502, corresponding to send_advertisement message 220 in FIG. 2). This advertisement is an interest that is akin to a beacon, and, based on the "/add" name space used, does not request any content in return. Upon receiving a request from a remote node for the manifest, the local node transmits the manifest to the remote node (operation 504, corresponding to receiving request_manifest_in_chunks interest 226 and send_manifest_in_chunks message 228 in FIG. 2). Upon receiving a request from a remote node for a content object identified in the local manifest, the local node transmits the requested content object to the requesting remote node (operation 506, corresponding to receiving request_set_difference interest 234 and send_set_different message 236 in FIG. 2).

Manifest Contents During Synchronization

Figure 6A:
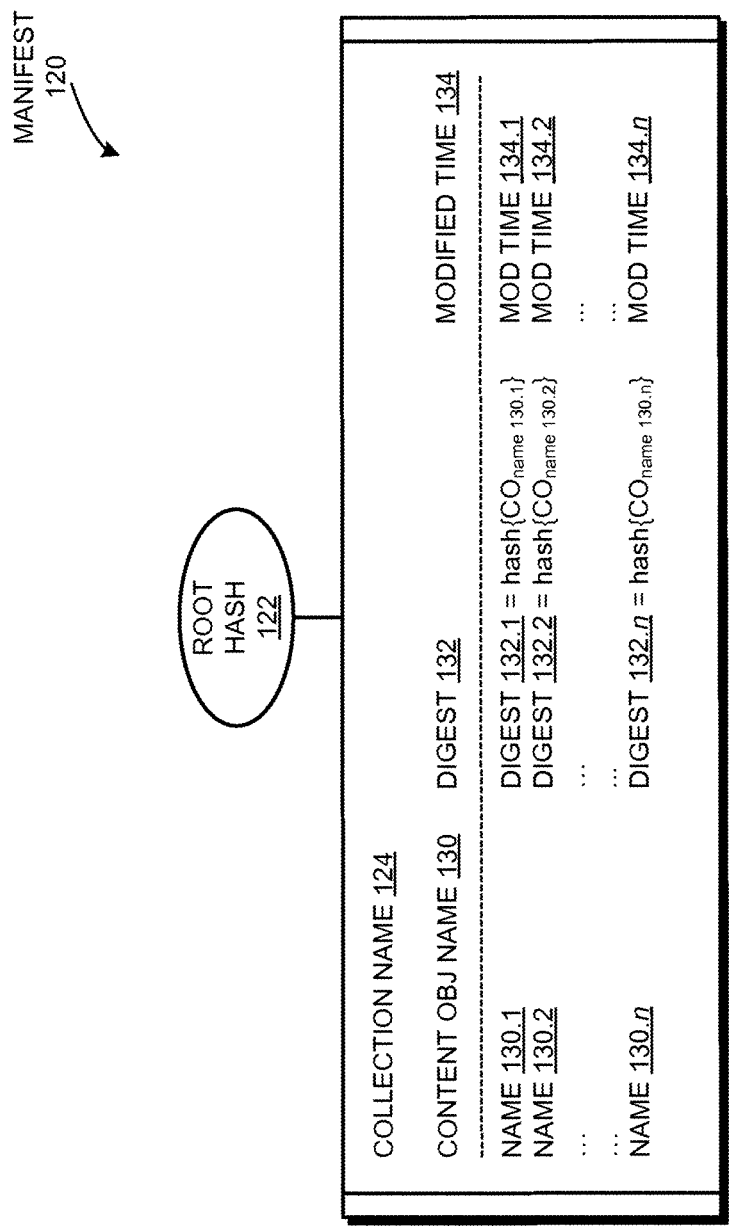
FIG. 6A presents a table depicting the format of a manifest and the content objects represented in the collection, in accordance with an embodiment of the present invention.

FIG. 6A presents a table depicting the format of a manifest 120 and the content objects represented in the collection, in accordance with an embodiment of the present invention. Manifest 120 comprises an ordered list of content objects identified by a collection name 124 and one or more of the following: a content object name 130.1-130.n; a digest 132.1-132.n; and a modified time 134.1-134.n. The digests 132.1-132.n comprise a hash value of the content object identified respectively by names 130.1-130.n. Manifest 120 also includes a root hash 122, which is an additive hash value based on the hash values 132.1-132.n of the individual content objects of the collection. Root hash 122 of manifest 120 is a unique identifier for manifest 120.

As described in relation to FIG. 1, manifest 120 can indicate a name and corresponding digest for each content object represented in the collection. In some embodiments, manifest 120 can also include a modified time for each content object represented in the collection. The use of the modified time field depends on the underlying application or service being performed. Note that manifest 120 indicates collection name 124. The manifests depicted in FIGS. 6B-E also include a collection name, but because the exemplary manifests comprise the same collections of data, the collection name is not included in FIGS. 6B-6E.

FIGS. 6B-6E depict two nodes, node 102 and node 106, which each contain a manifest. In this example, node 102 is the remote node and node 106 is the local node. Local node 106 contains a manifest 160, and remote node 102 contains a manifest 140. Manifests 140 and 160 contain the same collection name, or routing prefix, and thus represent the same collection of content objects or data. Time is indicated by the labels T1, T2, etc., and the contents of manifests 140 and 160 are depicted in relation to these time labels.

Recall that a manifest is further identified by a root hash value, illustrated as root hash 122 in FIG. 6A, which is an additive hash value based on the digests of the individual content objects of the collection. In the below examples, the root hash value and the digests are indicated as a number in brackets, e.g., "{999}", though the number can be much larger than this. In addition, both the digests of the content objects and the exemplar root hash values of manifest 140 and manifest 160 that change over time are depicted only as sample representations of additive hash values.

Local Manifest Missing a Content Object from Remote Manifest

Figure 6B:
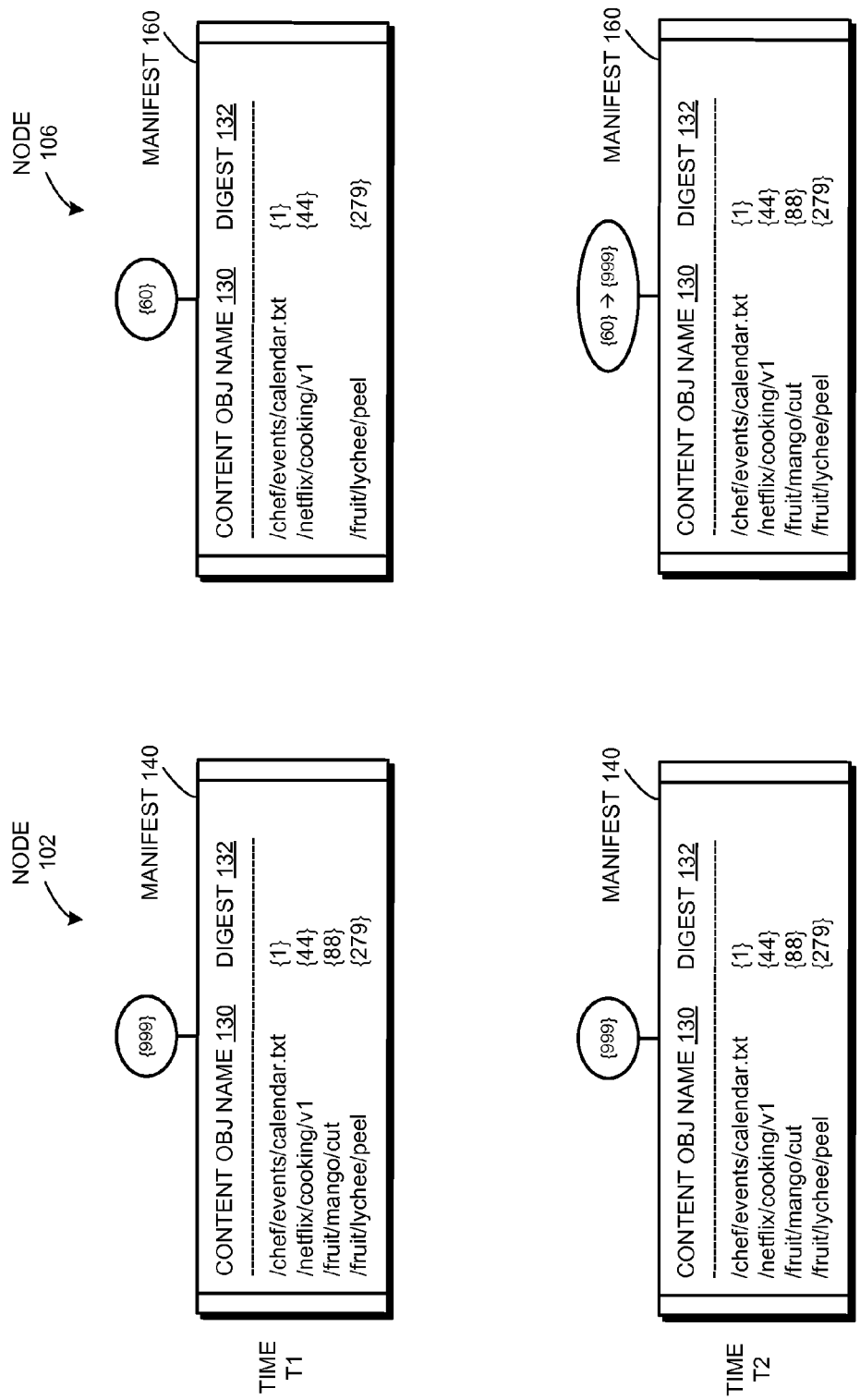
FIG. 6B presents tables depicting the format of two manifests during synchronization, where the local manifest is missing a content object from the remote manifest, in accordance with an embodiment of the present invention.

FIG. 6B presents tables depicting the format of two manifests during synchronization, where the local manifest is missing a content object from the remote manifest, in accordance with an embodiment of the present invention. At time T1, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {60}, is not synchronized with remote manifest 140, which has a root hash value of {999}. Local node 106 then determines the set difference between its local manifest 160 and remote manifest 140. In this example, manifest 160 is missing the content object identified by the name of "/fruit/lychee/peel," so local node 106 sends an interest to remote node 102 for the content object by that name. Remote node 102 returns the requested content object. At time T2, local node 106 updates it manifest 160 with the missing content object. Based on the contents of manifest 160 at time T2, the system generates a new root hash value for manifest 160, which now equals the root hash value of the remote manifest. This is depicted by the root hash value of manifest 160 at time T2: {60}→{999}. Thus, the local manifest and the remote manifest have synchronized their collections and both contain the same root hash value of {999}.

Figure 6C:
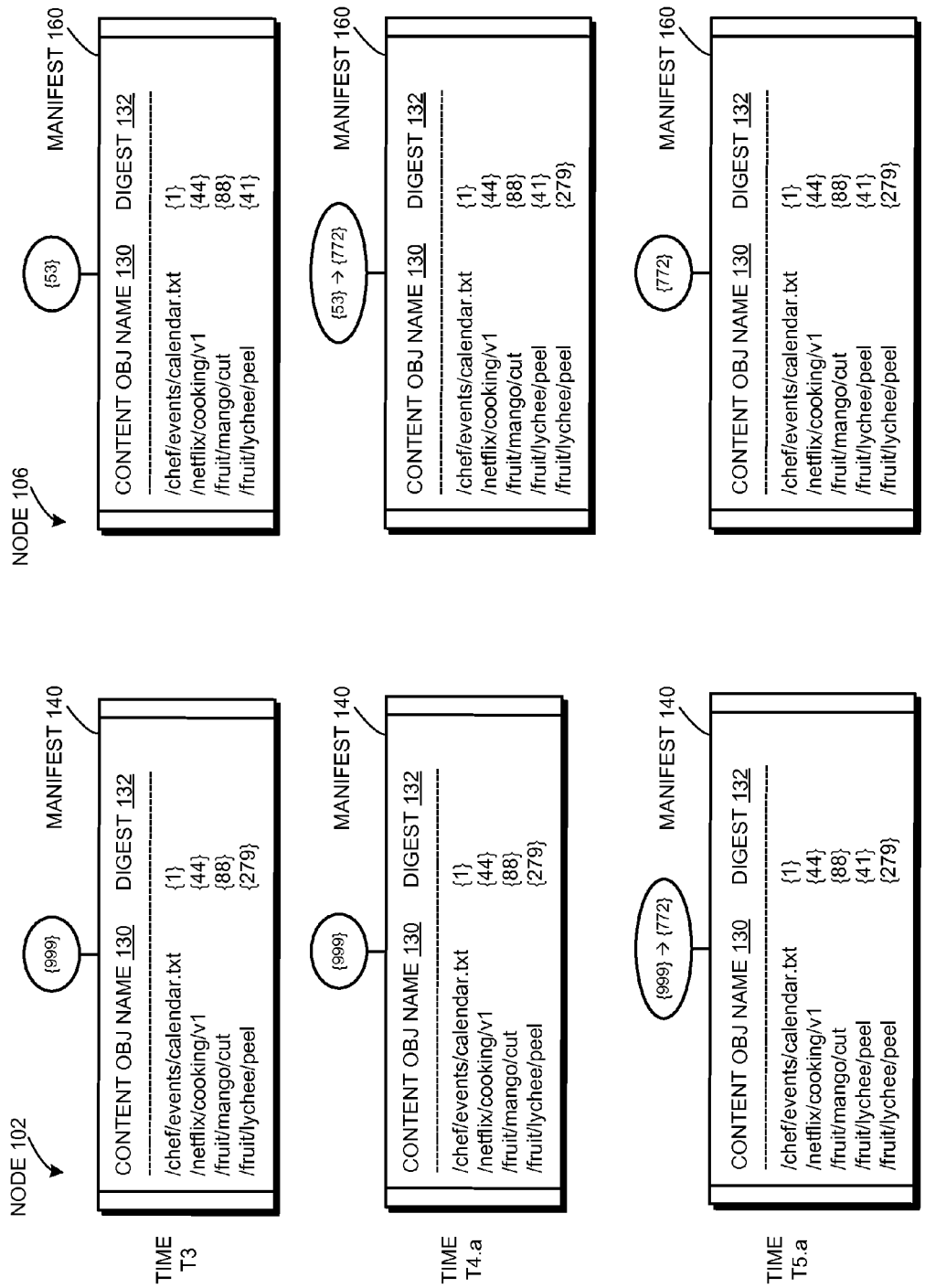
FIG. 6C presents tables depicting the format of two manifests during synchronization, where the digest of a same named content object in the local manifest is different from the digest in the remote manifest, and where the remote node advertises its manifest, in accordance with an embodiment of the present invention.

Local and Remote Manifests Contain Content Object with Same Name, but Different Digest: Local Node Retrieves Manifest First FIG. 6C presents tables depicting the format of two manifests during synchronization, where the digest of a same named content object in the local manifest is different from the digest in the remote manifest, and where the remote node sends the advertisement and the local node retrieves the remote manifest, in accordance with an embodiment of the present invention. At time T3, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {53}, is not synchronized with remote manifest 140, which has a root hash value of {999}. Local node 106 then determines the set difference between its local manifest 160 and remote manifest 140. In this example, manifest 160 is missing the content object identified by the name of "/fruit/lychee/peel" with a digest of {279}, so local node 106 sends an interest to remote node 102 for the content object based on that name and digest. Remote node 102 returns the requested content object. At time T4.*a*, local node 106 updates it manifest 160 with the missing content object. Based on the contents of manifest 160 at time T4.*a*, the system generates a new root hash value for manifest 160. This is depicted by the root hash value of manifest 160 at time T4.*a*: {53}→{772}. However, manifest 140, with its original root hash value of {999}, is now out of sync with manifest 160, which has the new root hash value of {772}.

Subsequently, remote node 102 receives a hash advertisement from local node 106 of manifest 160, with the new root hash value of {772}. Remote node 102 determines that its manifest 140 represents the same collection of data as manifest 160 and retrieves manifest 160. Remote node 102 determines that manifest 140, with a root hash value of {999}, is not synchronized with manifest 160, which has a root hash value of {772}. Remote node 102 then determines the set difference between its manifest 140 and manifest 160. In this example, manifest 140 is missing the content object identified by the name of "/fruit/lychee/peel" with a digest of {41}, so remote node 102 sends an interest to local node 106 for the content object based on that name and digest. Local node 106 returns the requested content object. At time T5.*a*, remote node 102 updates it manifest 140 with the missing content object. Based on the contents of manifest 140 at time T5.*a*, the system generates a new root hash value for manifest 140. This is depicted by the root hash value of manifest 140 at time T5.*a*: {999}→{772}. Thus, at time T5.*a*, manifest 140 at node 102 is in sync with manifest 160 at node 106. Nodes 102 and 106 have synchronized their collections and both contain the same root hash value of {772}.

Local and Remote Manifests Contain Content Object with Same Name, but Different Digest: Remote Node Retrieves Manifest First FIG. 6D presents tables depicting the format of two manifests during synchronization, where the digest of a same named content object in the local manifest is different from the digest in the remote manifest, and where the local node sends the advertisement and the remote node retrieves the local manifest, in accordance with an embodiment of the present invention. At time T3, remote node 102 receives a hash advertisement from local node 106 of manifest 160, with a root hash value of {53}. Remote node 102 determines that its manifest 140 represents the same collection of data as manifest 160 and retrieves manifest 160. Remote node 102 determines that its manifest 140, with a root hash value of {999}, is not synchronized with manifest 160, which has a root hash value of {53}. Remote node 102 then determines the set difference between its manifest 140 and manifest 160. In this example, manifest 140 is missing the content object identified by the name of "/fruit/lychee/peel" with a digest of {41}, so remote node 102 sends an interest to local node 106 for the content object based on that name and digest. Local node 106 returns the requested content object. At time T4.*b*, remote node 102 updates it manifest 140 with the missing content object. Based on the contents of manifest 140 at time T4.*b*, the system generates a new root hash value for manifest 140. This is depicted by the root hash value of manifest 140 at time T4.*b*: {999}→{772}. However, manifest 160, with its original root hash value of {53}, is now out of sync with manifest 140, which has a new root hash value of {772}.

Subsequently, local node 106 receives a hash advertisement from remote node 102 of manifest 140, with the new root hash value of {772}. Local node 106 determines that its manifest 160 represents the same collection of data as manifest 140 and retrieves manifest 140. Local node 106 determines that its manifest 160, with a root hash value of {53}, is not synchronized with manifest 140, which has a root hash value of {772}. Local node 106 then determines the set difference between its local manifest 160 and remote manifest 140. In this example, manifest 160 is missing the content object identified by the name of "/fruit/lychee/peel"

with a digest of {41}, so local node 106 sends an interest to remote node 102 for the content object based on that name and digest. Remote node 102 returns the requested content object. At time T5.*b*, local node 106 updates it manifest 160 with the missing content object. Based on the contents of manifest 160 at time T5.*b*, the system generates a new root hash value for manifest 160. This is depicted by the root hash value of manifest 160 at time T5.*b*: {53}→{772}. Thus, at time T5.*b*, manifest 140 at node 102 is in synchronization with manifest 160 at node 106. Nodes 102 and 106 have synchronized their collections and both contain the same root hash value of {772}.

FIGS. 6C and 6D illustrate that any node can be a remote or a local node, and that the order of sending or receiving hash advertisements, manifests, and content objects determined to be different associated with the manifest may differ depending on the contents in a collection at a given time, e.g., the contents of manifests 140 and 160 at times [T3, T4.*a*, T5.*a*] and at times [T3, T4.*b*, T5.*b*]. That is, any node can send or receive a hash advertisement, transfer a manifest, and synchronize the contents of a manifest at the node using the methods described in this disclosure, thereby resulting in the synchronization of data collections at two nodes.

Synchronization Using Modified Time

Figure 6E:
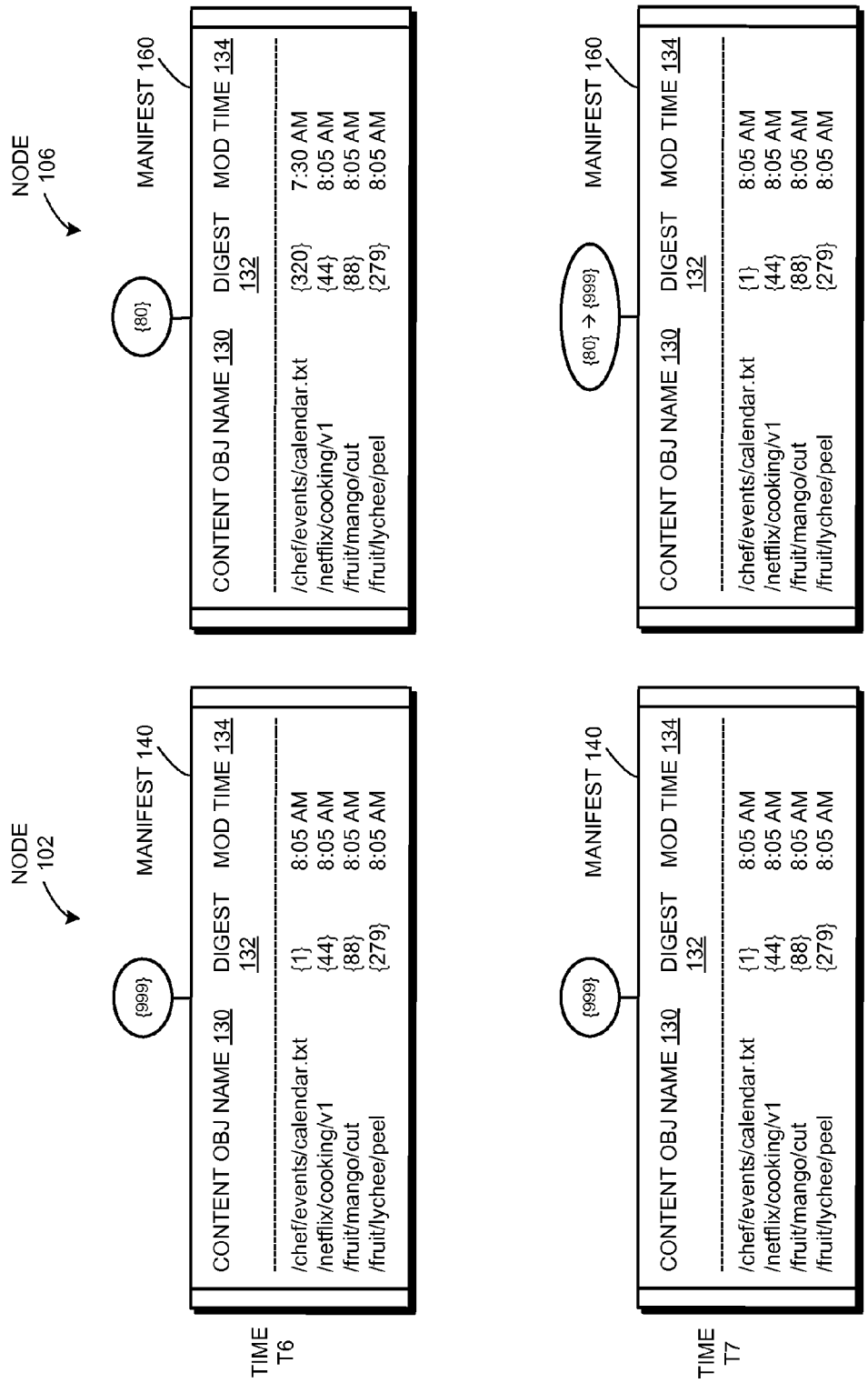
FIG. 6E presents tables depicting the format of two manifests during synchronization, when the digest and modified time of a same named content object in the local manifest is different from the digest in the remote manifest, in accordance with an embodiment of the present invention.

FIG. 6E presents tables depicting the format of two manifests during synchronization, where the digest and modified time of a same named content object in the local manifest is different from the digest and modified time in the remote manifest, in accordance with an embodiment of the present invention.

At time T6, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {80}, is not synchronized with remote manifest 140, which has a root hash value of {999}. Local node 106 then determines the set difference between its local manifest 160 and remote manifest 140. In this example, both manifest 140 and manifest 160 indicate a modified time 134 corresponding to each content object represented in its collection. The system determines that a content object with the same name in manifest 140 and manifest 160 has a different digest and a different modified time. Note that a modified time can include information relating to the second, minute, hour, day, month, and year that a corresponding content object was modified. For simplicity, the exemplary manifests in FIG. 6E contain only a time of the day. Manifest 140 contains a content object identified by the name of "/chef/events/calendar.txt" with a digest of {1} and a modified time of 8:05 am. Manifest 160 contains a content object identified by the same name with a different digest of {320} and a different modified time of 7:30 am. Local node 106 then sends an interest to remote node 102 for the content object based on the name and digest of the different content object. Remote node 102 returns the requested content object.

Local node determines that the content object from remote manifest 140 with a modified time of 8:05 am is more recent than the content object from its local manifest 160 with a modified time of 7:30 am. So, at time T7, local node 106 updates it manifest 160 with the different and more recent content object. Based on the contents of manifest 160 at time T7, the system generates a new root hash value for manifest 160. This is depicted by the root hash value of manifest 160 at time T7: {80}→{999}. Thus, at time T7, manifest 160 at local node 106 is in sync with manifest 140 at remote node 106. Nodes 102 and 106 have synchronized their collections and both contain the same root hash value of {999}.

In some embodiments, the system will retain the previous version of the changed content object (e.g., the content object identified by name "/chef/events/calendar.txt" with a digest of {320} and a modified time of 7:30 am) in a history field of manifest 160. In other embodiments, when remote node 102 receives a hash advertisement from local node 106 of manifest 160 with a root hash of {80} and downloads the local manifest 160, remote node 102 determines that the version of the received content object identified by name "/chef/events/calendar.txt" with a digest of {320} and a modified time of 7:30 am is less recent than the version in its own manifest. In this case, manifest 140 at remote node 102 remains out of synchronization with manifest 160 at local node 106. The manifests will undergo synchronization at a later time when local node 106 receives a hash advertisement from remote node 102 of manifest 140, which contains the more recently updated content object, as described above.

Service Discovery

In some embodiments, the system facilitates discovery of devices and services offered by the devices in a content-centric network (CCN). The CCN namespace is divided by service type, e.g., printers, file servers, or music libraries. Devices of a specific type perform the synchronization protocol described in this disclosure within those namespaces. For instance, the collection prefix for such services can take the form of:

/parc/services/printers/ . . .
/parc/services/servers/ . . .
/parc/services/music/ . . .

In such a service discovery system, a device (such as a printer named "/parc/marvin") at a node boots up with an empty manifest. The device creates a service record for itself, which is a content object with the name of "/parc/marvin/service." In some embodiments, this service record is of a JavaScript Object Notation (JSON) format, and can comprise one or more of the following fields: the name of the service record; a description of the service; a serial number that indicates a version of the service record; a time to live (TTL) measured in seconds, such that the service record expires if not refreshed periodically by the device advertising the service; and a digest for the service record, which is the hash value of the service record. Because the size of a service record is relatively small, in some embodiments, the service record can be included as the payload in an interest. Furthermore, service records with a higher serial number indicate a more recent service record and replace records with lower serial numbers. Older service records are not preserved in the manifest.

The device creates a manifest containing the service record of the device and the corresponding hash value of the service record. The system generates a root hash value, which is an additive hash value based on the digests of the content objects in the collection. The root hash value of the manifest of the device is initially based on the one service record indicated in the manifest. The device then sends a query advertisement of the form "/parc/services/printers/adv/query" so that it can perform the following: retrieve the manifests of other devices in the same service namespace ("parc/services/printers"); determine the set difference; and resolve the set difference. In this way, the device at this node synchronizes its manifest with the manifests of other devices at other nodes.

In some embodiments, a service record is set to expire based on the time indicated in the TTL field of the service record. At some time before this expiration time, the device can create a new service record with a sequentially greater serial number and replace the previous service record. A description of how to remove, or "white-out", a content item from a data collection is contained in U.S. patent application Ser. No. 13/681,306, previously incorporated by reference. The system generates a new root hash value for the manifest associated with the device based on the new service record. The device then advertises its updated manifest with the new service record using the newly created root hash value, and the above-described process repeats. Furthermore, upon the expiration of a service record, e.g., the TTL has elapsed, all devices remove the expired service record from their manifest and generate a new hash advertisement without the expired service record.

In some embodiments, when a device shuts down, it can create a new service record with a TTL set to 0 and a larger serial number. The device can advertise its manifest based on this updated service record and set itself to expire immediately after sending the advertisement, such that other devices that receive the advertisement are aware that this manifest includes the most recent service record based on the higher serial number.

In some embodiments, an advertised interest can contain a payload, which comprises the service record in its entirety, of the form: "/parc/services/printers/adv/<roothash>/<payload>."

Service Discovery: Exemplary Network and Manifest

Figure 7:
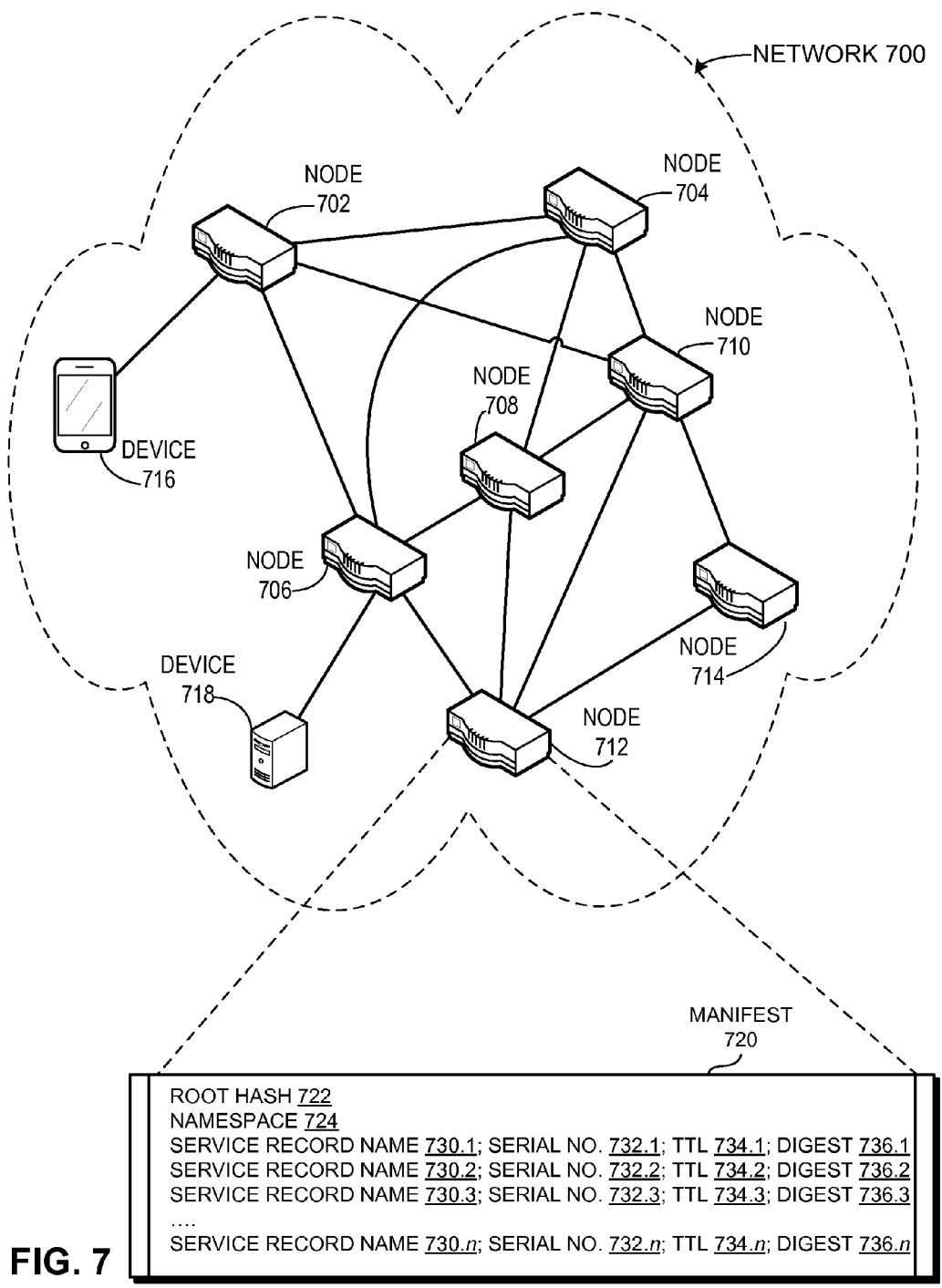
FIG. 7 illustrates an exemplary computer system that facilitates service discovery based on the synchronization of manifests between devices in a content centric network, in accordance with an embodiment of the present invention.

FIG. 7 illustrates an exemplary network 700 that facilitates service discovery based on the synchronization of manifests between devices in a content centric network, in accordance with an embodiment of the present invention. Network 700 can include a client device 716, a content producing device 718, and a router or other device (such as a printer) at nodes 702, 704, 706, 708, 710, 712, and 714. Nodes 702-714 can each contain one or more manifests. For example, node 712 contains a manifest 720. Manifest 720 comprises a prefix or a namespace 724 and an ordered list of service records identified by one or more of the following: a service record name 730.1-730.n; a serial number 732.1-732.n; a time to live (TTL) 734.1-734.n; and a digest 736.1-736.n. The digests 736.1-736.n comprise a hash value of the service record identified respectively by names 730.1-730.n. The digest can be a SHA-256 hash of the service record, where the likelihood of a hash collision (where the one-way hash of two different content objects results in the same value) is sufficiently low such that the digest is a unique identifier for the service record. Manifest 720 also includes a root hash 722, which is an additive hash value based on the hash values 736.1-736.n of the individual service records of the collection. Root hash 722 is a unique identifier for manifest 720 and represents the service records in the collection.

A device can exist at any node on a network, where each device carries a manifest which represents a collection of service records. Any two devices can carry a manifest that represents the same collection of data, e.g., service records for the same namespace, where the manifests can be synchronized using the methods described herein. The terms "local node" and "remote node" can apply to any node in a content-centric network (CCN) and are used in this disclosure to differentiate between two nodes in a CCN. Similarly, the terms "local device" and "remote device" can apply to a device at any node in a CCN and are used in this disclosure for exemplary purposes.

In some embodiments, an interest can contain as the payload one service record including its corresponding digest. Any node or device at a node in a CCN (e.g., device 716, device 718, and nodes 702-714) can send or receive an interest which is an advertisement that contains both the root hash value of the manifest of the sending device and the service record corresponding to the sending device. Furthermore, any node or device can send or receive an interest which is a query or request for such an advertisement, e.g., that contains both the root hash value of the manifest of the sending device and the service record of the sending device included as the payload.

Synchronization of Manifests Between Devices During Service Discovery

Figure 8:
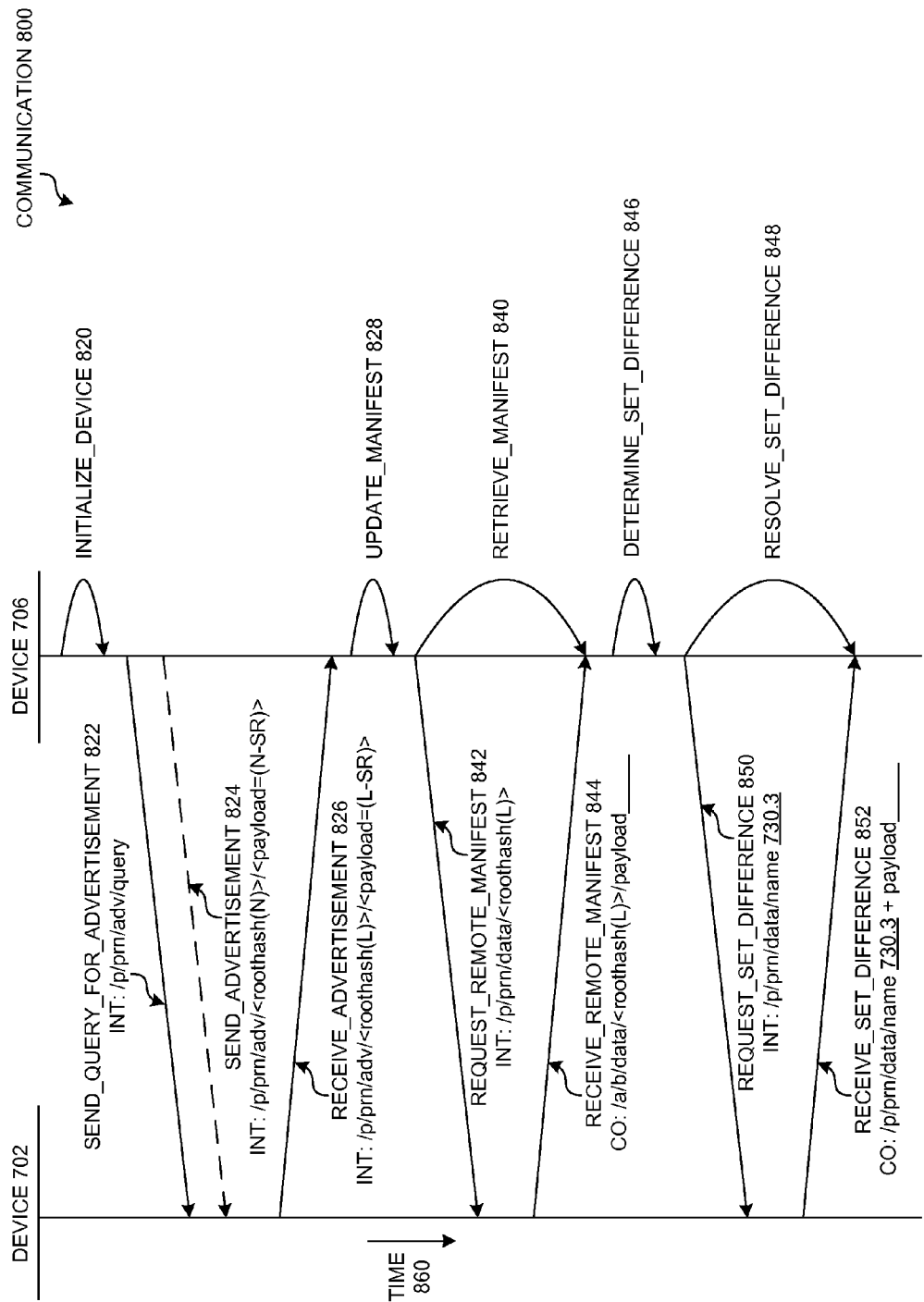
FIG. 8 illustrates exemplary communication between two devices, in accordance with an embodiment of the present invention.

FIG. 8 illustrates exemplary communication 800 between a device 702 (remote device, "Larry") and a device 706 (local device, "Nancy"), in accordance with an embodiment of the present invention. Device 702 and device 706 each contain a manifest with the same routing prefix, or namespace, "/p/prn/." Assume that remote device 702 has already initialized onto the network and contains a manifest ("L") comprised of at least its own its service record, "L-SR." Local device 706 initializes in an initialize_device procedure 820. Local device 706 creates a service record for itself, "N-SR" and then creates a local manifest for itself ("N") comprised of its own service record. Local device also generates a root hash value for its own manifest, "<roothash (N)>". Local device 706 transmits a send_query_for_advertisement interest 822 to remote device 702 of the form: "/p/prn/adv/query." Note that any device on the network can receive this interest containing a query for an advertisement. Local device 706 also advertises its own manifest and service record, by transmitting a send advertisement interest 824. This advertisement is a hash advertisement that contains the root hash value of its manifest "N" and contains as the payload the service record of the local device: "p/prn/adv/<roothash(N)>/<payload=(N-SR)>." Send_advertisement 824 (depicted with a dashed line) can be transmitted by local device 706 repeatedly, and thus does not occur only after initialization. Nodes or devices can use a gossip protocol to avoid flooding a segment with many repeats. For example, a node can pick a random backoff, where a first node advertises its root hash and a second node with the same root hash also advertises its root hash. A third or subsequent node with the same root hash can suppress sending its root hash.

Local device 706 can receive a receive_advertisement interest 826, which is similar in format to interest 824, and contains both the root hash of the manifest of the remote device and, as payload, the service record of the remote device: "/p/prn/adv/<roothash(L)>/<payload=(L-SR)>." Local device performs an update_manifest procedure 828. Local device 706 determines if its manifest indicates the same namespace as the manifest of the advertise interest, based on the same collection prefix or namespace ("/p/prn/"). Local device 706 updates it local manifest by inserting the advertised service record included as payload in interest 826 into its local manifest, if the included service record is more recent than what local device 702 already has. Local device 706 then generates a new root hash value for its local manifest. If the new root hash value is equal to the root hash value of the advertised interest from interest 826, then the collections of service records in the manifest of local device 706 and remote device 702 are synchronized.

Thus, because the interest contains as payload the service record of the remote device, the remote and local manifests are synchronized without needing to transfer a manifest across the network.

If the new root hash value of local device 706 is not equal to the root hash value of the advertised interest 826, then local device 706 performs a set reconciliation using the methods described in relation to FIGS. 1-6. Local device 706 performs a retrieve_manifest procedure 840, by sending a request_remote_manifest interest 842 (of the form "/p/prn/data/<roothash(L)>") and receiving a receive_remote_manifest message 844 (of the form "/p/prn/data/<roothash(L)>"). Local device 706 performs a determine_set_difference procedure 846 to determine which service records represented in the remote manifest are different from the service records represented in its local manifest. Local device 706 performs a resolve_set_difference procedure 848, by sending a request_set_difference interest 850 (of the form "/p/prn/data/name 730.3>") and receiving a receive_set_difference message 852 (of the form "/p/prn/data/name 730.3+payload").

Figure 9A:
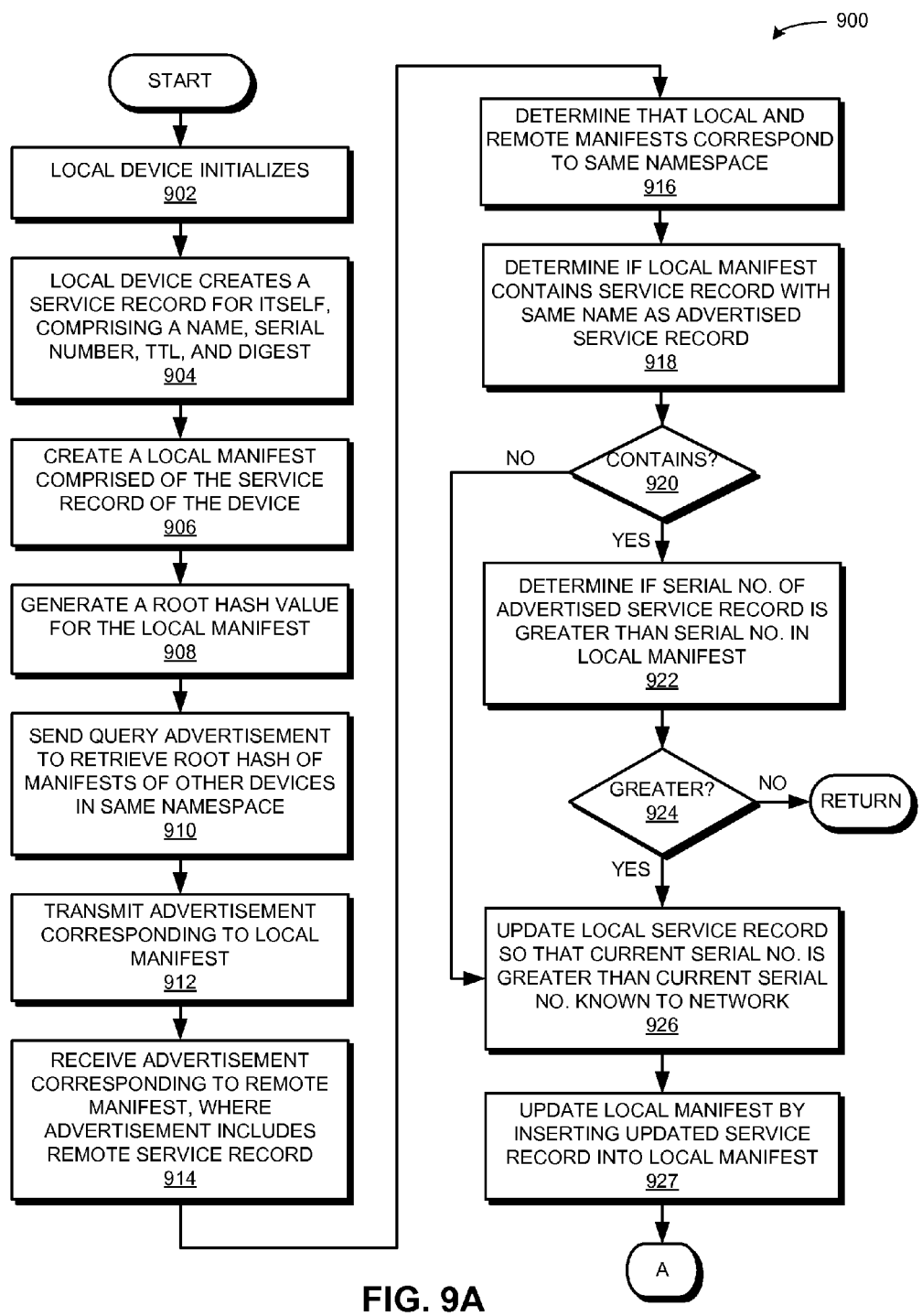
FIGS. 9A and 9B presents a flow chart illustrating a method for facilitating service discovery based on synchronization of the manifests of two devices in the network, in accordance with an embodiment of the present invention.

FIG. 9A presents a flow chart 900 illustrating a method for facilitating service discovery based on synchronizing the manifests of two devices in the network, in accordance with an embodiment of the present invention. A local device initializes onto a network (operation 902). The local device creates a service record for itself, comprising a name of the service record, a serial number, a time to live (TTL), and a digest (operation 904). The local device creates a local manifest comprised of the service record of the local device (operation 906) and generates a root hash value for the local manifest based on the digest of the service record contained in the manifest (operation 908). The local device sends a query advertisement to retrieve the root hash value of the manifests of other devices in the same namespace (operation 910). The local device transmits an advertisement corresponding to its local manifest, where the advertisement contains the root hash value of the local manifest and carries as the payload the local service record (operation 912). The local device receives an advertisement corresponding to a remote manifest, and the advertisement contains the root hash value of the remote manifest and carries as the payload the remote service record (operation 914).

The local device determines that its local manifest and the remote manifest correspond to the same namespace (operation 916). In some embodiments, the local device determines if the local manifest contains a service record with the same name as the name of the advertised service record (operation 918). If the local manifest does not contain such a service record (decision 920), then the local device updates the local manifest by inserting the advertised service record from the payload into the local manifest (operation 926). If the local manifest does contain such a service record (decision 920), then the local device determines if the serial number of the advertised service record is greater than the serial number of the same named service record in the local manifest (operation 922). If it is not greater (decision 924), then the method returns because the version contained in the local device is more recent.

If the serial number of the advertised service record is greater than the serial number of the same named service record in the local manifest (decision 924), then the local device updates the local service record so that the current serial number is greater than the serial number currently known to the network (operation 926). In some embodiments, this condition can exist if a device reboots and loses its memory, such that its serial number initializes to less than what it last advertised before the failure. The local device then updates the local manifest by inserting the updated service record into the local manifest (operation 927). A description of how to remove, or "white-out", a content item from a data collection is contained in U.S. patent application Ser. No. 13/681,306, previously incorporated by reference.

Figure 9B:
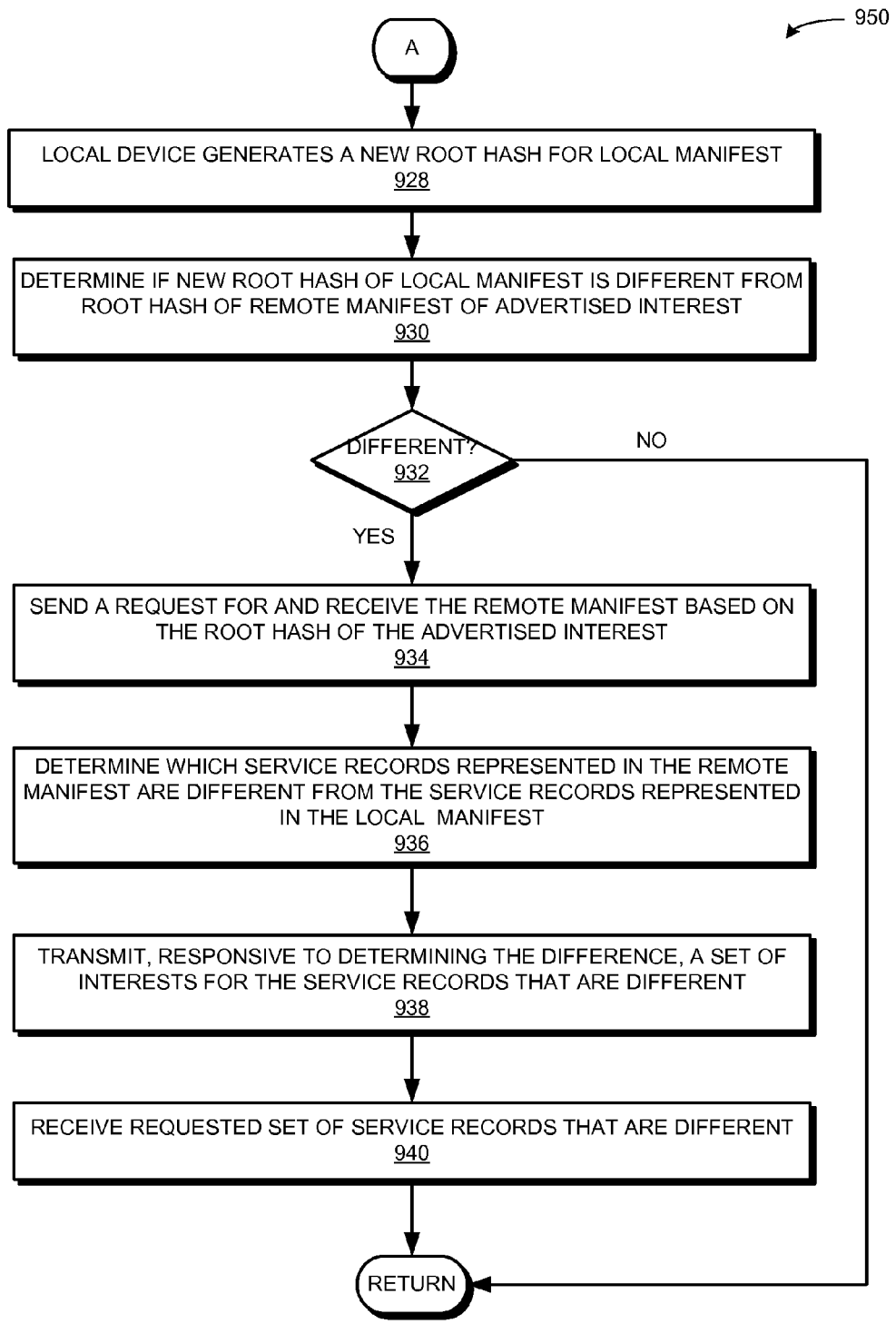

FIG. 9B presents a flow chart 950 illustrating the continuation of the method depicted in flow chart 900 of FIG. 9A. After updating its local manifest (operation 926), the local device generates a new root hash value for the local manifest (operation 928). The local device determines if the new root hash value is different from the root hash value of the remote manifest included in the advertised interest (operation 930). If the hash values are not different (decision 932), then the method returns because the remote manifest and the local manifest are in synchronization. If the hash values are different (decision 932), then the local device performs the set reconciliation and manifest transfer described above in relation to FIGS. 1-6. The local device sends a request for and receives the remote manifest based on the root hash value of the advertised interest (operation 934). The local device determines which service records represented in the remote manifest are different from the service records represented in the local manifest (operation 936). Responsive to determining the difference, the local device transmits a set of interests for the service records that are different (operation 938) and receives the set of requested service records (operation 940).

Manifest Contents During Service Discovery

Figure 10A:
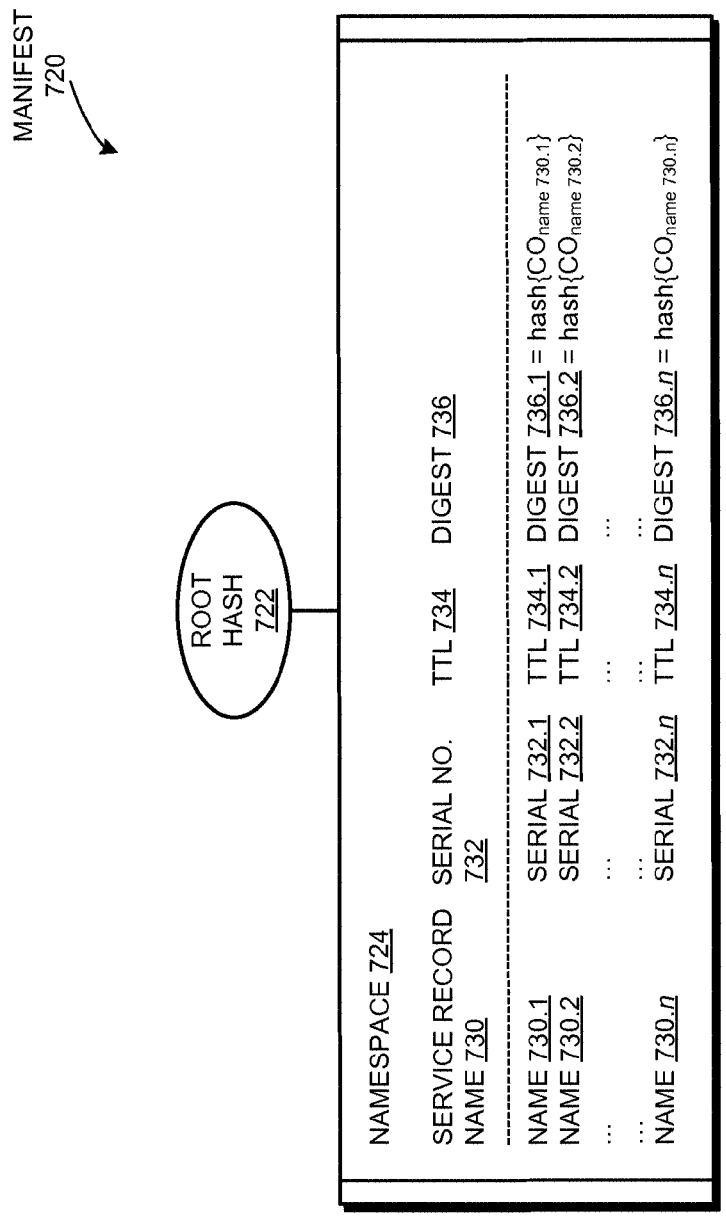
FIG. 10A presents a table depicting the format of a manifest and the service records represented in the collection, in accordance with an embodiment of the present invention.

FIG. 10A presents a table depicting the format of a manifest 720 and the service records represented in the collection, in accordance with an embodiment of the present invention. Manifest 720 comprises a prefix or a namespace 724 and an ordered list of service records identified by one or more of the following: a service record name 730.1-730.*n*; a serial number 732.1-732.*n*; a time to live (TTL) 734.1-734.*n*; and a digest 736.1-736.*n*. The digests 736.1-736.*n* comprise a hash value of the content object identified respectively by names 730.1-730.*n*. The digest can be a SHA-256 hash of the content object, where the likelihood of a hash collision (where the one-way hash of two different content objects results in the same value) is sufficiently low such that the digest is a unique identifier for the content object. Manifest 720 also includes a root hash 722, which is an additive hash value based on the hash values 736.1-736.*n* of the individual content objects of the collection. Root hash 722 is a unique identifier for manifest 720 and represents the service records in the collection. In the below examples, the root hash value and the digests are indicated as a number in brackets, e.g., "{222}", though the number can be much larger than this. In addition, both the digests of the service records and the exemplar root hash values of manifests 740, 760, and 780 in FIGS. 10B-10D that change over time are depicted only as sample representations of additive hash values.

Interest Contains Service Record; Full Manifest not Required

Figure 10B:
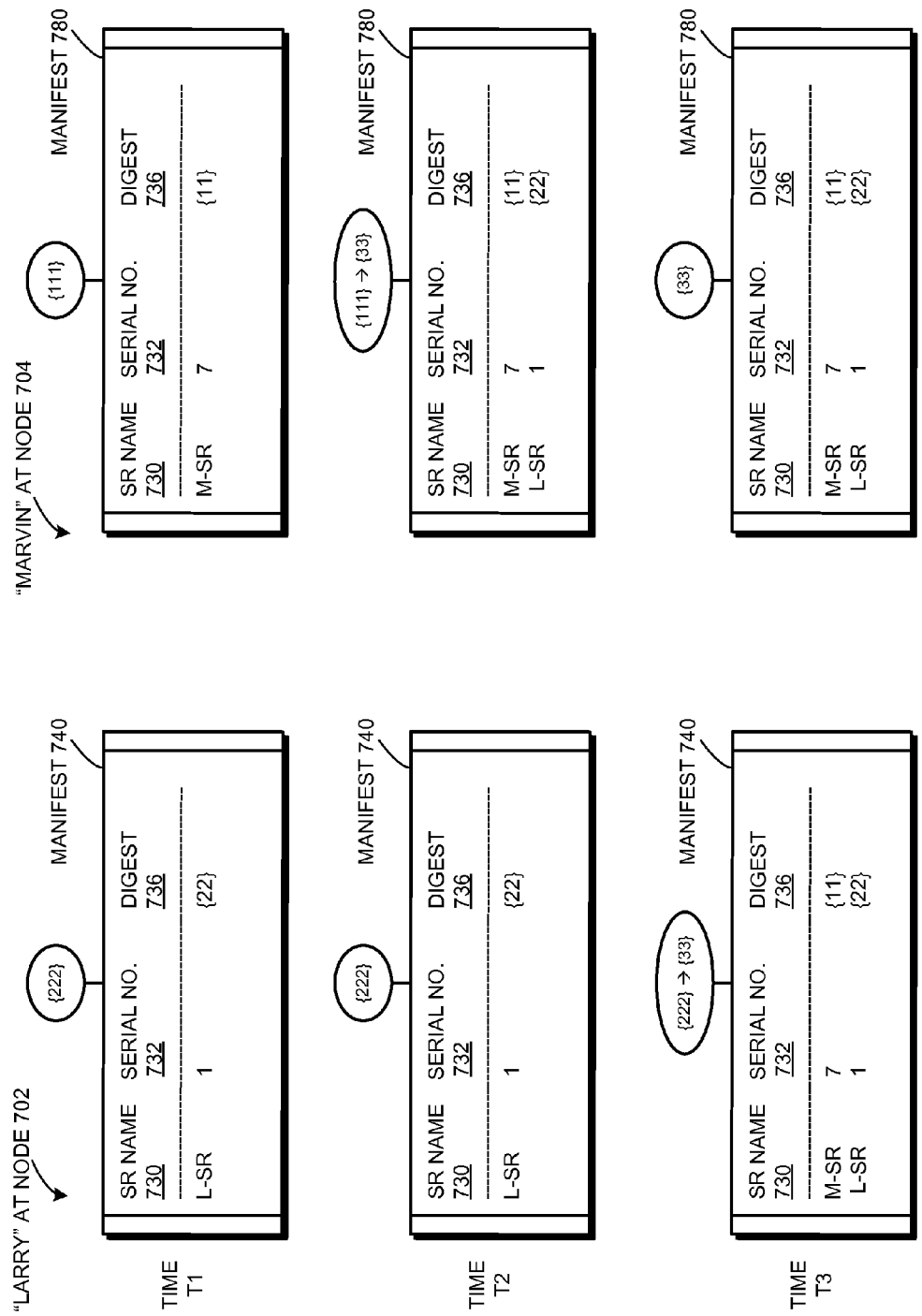
FIG. 10B presents tables depicting the format of two manifests during service discovery using the synchronization protocol, where the local device does not need to retrieve the remote manifest, in accordance with an embodiment of the present invention.

FIG. 10B presents tables depicting the format of two manifests during service discovery using the synchronization protocol, where the local device does not need to retrieve the remote manifest, in accordance with an embodiment of the present invention. At time T1, a printer named "/parc/larry" ("Larry") is operational at node 702, and a printer named "/parc/marvin" ("Marvin") is operational at node 704. Printers Larry and Marvin both belong to the namespace "/parc/services/printer" and thus each contain manifests which require synchronization with all of the other manifests in the same namespace. A manifest 740 associated with the printer, or device, named Larry contains one service record corresponding to the device Larry. The service record corresponding to Larry is denoted by a name of "L-SR," a serial number of 1, and a corresponding digest of {22}. The root hash value of manifest 170 is {222}. A manifest 780 associated with the printer, or device, named Marvin contains one service record corresponding to the device Marvin. The service record corresponding to Marvin is denoted by a name of "M-SR", a serial number of 7, and a corresponding digest of {11}. The root hash value of manifest 780 is {111}.

During operation, at time T1, Larry sends an advertisement of the form "/parc/services/printer/adv/<roothash={222}>/<payload, (L-SR)>." Marvin receives this advertisement and determines that its manifest 780 is missing the service record "L-SR" included as the payload in the advertisement. At time T2, Marvin inserts the service record "L-SR" into its manifest 780 and generates a new root hash value for manifest 780 based on the hash values of the existing service records indicated in the manifest ("M-SR" and "L-SR"). This is depicted by {111}→{33}.

At time T2, manifest 780, with the new root hash of {33}, is not synchronized with advertised manifest 740, which has a root hash of {222}. Marvin sends an advertisement of the form "/parc/services/printer/advkroothash={33}>/<payload, (M-SR)>." Larry receives this advertisement and determines that its manifest 740 is missing the service record "M-SR" included as the payload in the advertisement. At time T3, Larry inserts the service record "M-SR" into its manifest 740 and then generates a new root hash value for manifest 740 based on the hash values of the existing service records indicated in manifest 740 ("L-SR" and "M-SR"). This is depicted by {222}→{33}. In this way, the devices Larry and Marvin at nodes 702 and 704 have synchronized their respective manifests 740 and 780 with each other without either device needing to download the full manifest from the other device.

Figure 10C:
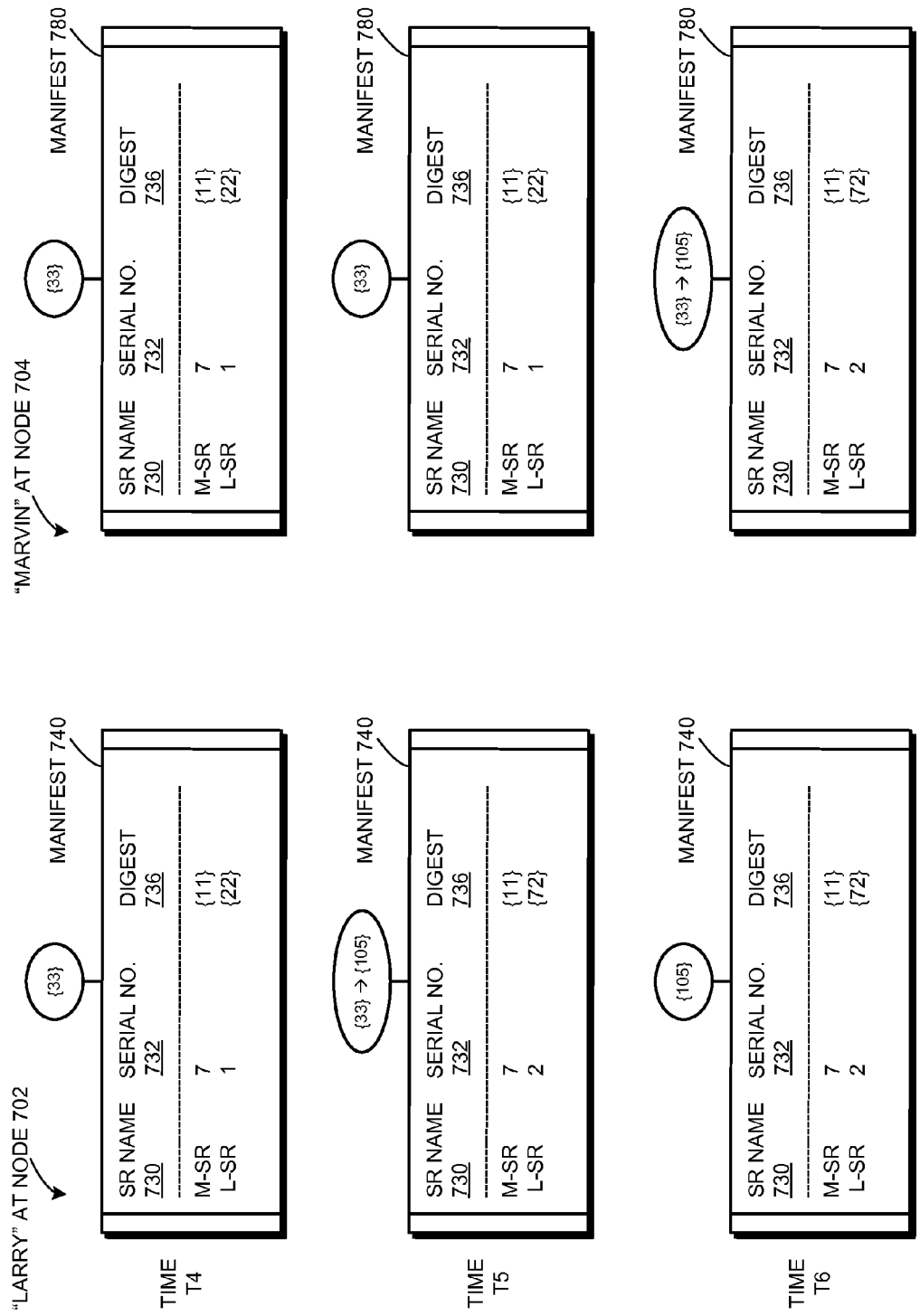
FIG. 10C presents tables depicting the format of two manifests during service discovery using the synchronization protocol, where the local device receives an updated service record from the remote device, in accordance with an embodiment of the present invention.

FIG. 10C presents tables depicting the format of two manifests during service discovery using the synchronization protocol, where the local device receives an updated service record from the remote device, in accordance with an embodiment of the present invention. At time T4, manifests 740 and 780 are in synchronization with each other and both contain a root hash of {33}. At time T5, Larry updates its own service record "L-SR" and assigns a serial number of 2, and a new digest of {72}. Larry generates a new root hash value for manifest 740 based on the hash values of the existing service records indicated in manifest 740 ("L-SR" as updated and "M-SR"). This is depicted by {33} {105}. Larry sends an advertisement of the form "/parc/services/printer/advkroothash={105}>/<payload, (L-SR)>." Marvin receives this advertisement and the updated service record of Larry with a digest of {72} and determines that its manifest 780 contains a version of "L-SR" with a serial number ("1") that is less than the serial number of the service record included in the advertisement ("2"). At time T6, Marvin updates manifest 780 by updating the service record with the name "L-SR" and a serial number of 1 in manifest 780 with the advertised service record of manifest 740, which has a serial number of 2 and a digest of {72}. Marvin generates a new root hash value for manifest 780, which is depicted by {33} {105}. Thus, the devices Larry and Marvin at nodes 702 and 704 have synchronized their respective manifests with each other without either device needing to download the full manifest from the other device.

Service Discovery by New Device on Network

Figure 10D:
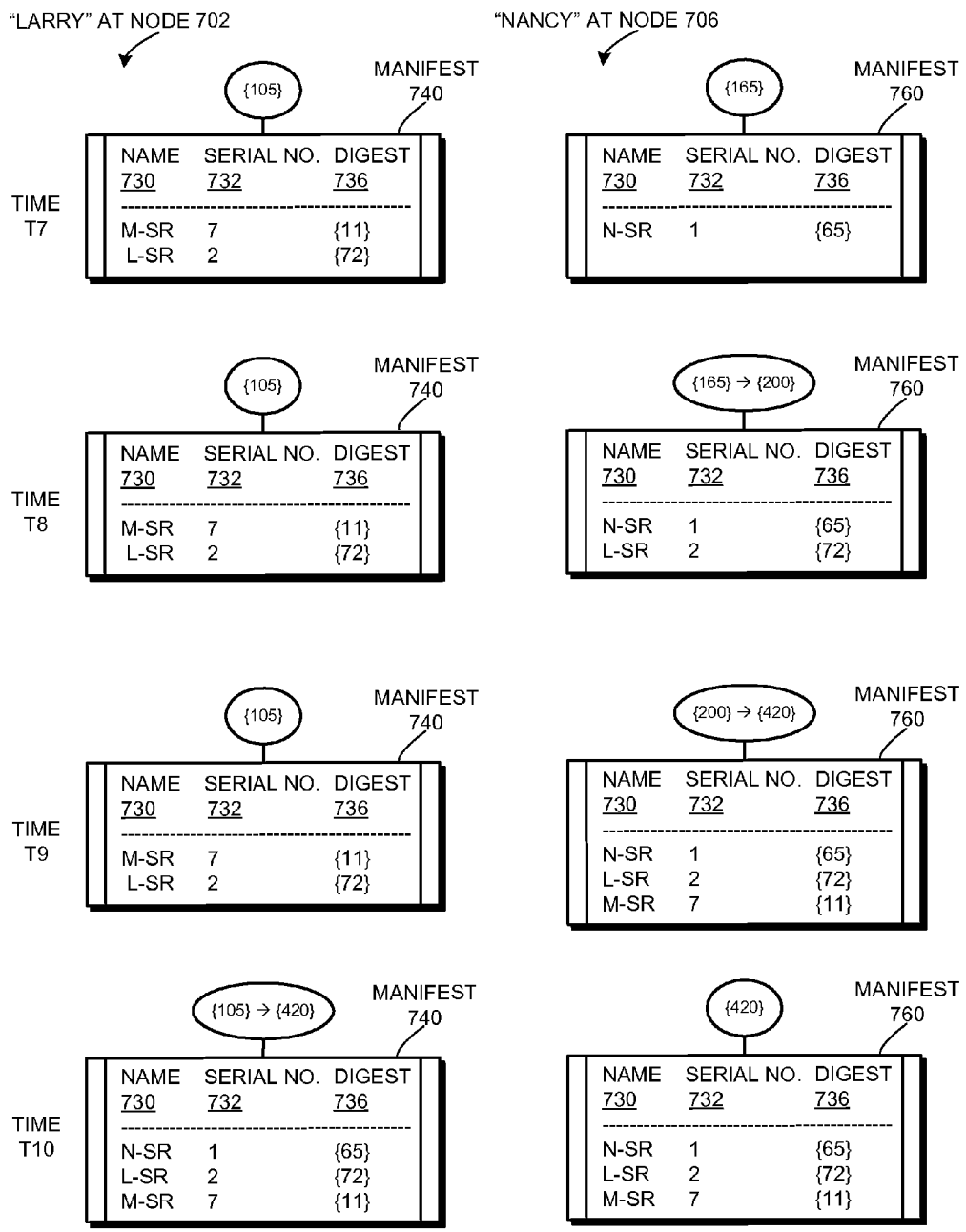
FIG. 10D presents tables depicting the format of two manifests during service discovery using the synchronization protocol, where the local device initializes, performs service discovery, and retrieves the remote manifest, in accordance with an embodiment of the present invention.

FIG. 10D presents tables depicting the format of two manifests during service discovery using the synchronization protocol, where the local device initializes, performs service discovery, and retrieves the remote manifest, in accordance with an embodiment of the present invention.

At time T6 shown in FIG. 10C, the devices named Larry and Marvin are operational, with respective manifests 740 and 780 at nodes 702 and 704. Manifests 740 and 780 are in synchronization and each contain: the service record of Larry ("L-SR") with a serial number of 2 and a digest of {72}; and the service record of Marvin ("M-SR") with a serial number of 7 and a digest of {11}. The root hash of manifests 740 and 780 is {105}.

At time T7 shown in FIG. 10D, device Larry is operational at node 702 with manifest 740 which contains two service records: the service record for Larry with a name of "L-SR", a serial number of 2, and a digest of {72}; and the service record for Marvin with a name of "M-SR", a serial number of 7, and a digest of {11}. The root hash value of manifest 740 is {105}. Note that at time T7, the manifest for Marvin (not shown in FIG. 10D) is in synchronization with manifest 740 of Larry. At time T7, a printer with a name of "/parc/nancy" ("Nancy") boots up and is operational at node 706. Device Nancy belongs to the same namespace as Larry and Marvin: "parc/services/printers". Nancy creates a service record for itself, which is a service record with a name of "N-SR," a serial number of 1, and a corresponding digest of {65}. Nancy creates a manifest 760 which contains the newly created service record and generates a root hash value for the manifest of {165}. Nancy then sends an advertisement query to the network for the namespace "parc/services/printers" in the form of: "/parc/services/printers/adv/query." Nancy receives an advertisement from Larry of the form: "/parc/printers/advkroothash={105}>/<payload, (L-SR)>." Nancy receives this advertisement and determines that its manifest 760 is missing the service record "L-SR" included as the payload in the advertised hash. At time T8, Nancy inserts the service record "L-SR" into its manifest 760 and generates a new root hash value for manifest 760 based on the hash values of the existing service records indicated in the manifest ("N-SR" and "L-SR"). This is depicted by {165}→{200}. Nancy determines that the root hash {200} of its manifest 190 is not the same as the root hash {105} of the advertised interest, so Nancy performs a full set reconciliation using the methods described herein.

Nancy retrieves the manifest with a root hash value of {105} by sending a set of interests in the form of "parc/services/printers/data/<roothash={105}>/S0", "parc/services/printers/data/<roothash={105}>/S1", "parc/services/printers/data/<roothash={105}>/S2", etc. based on a chunking protocol, and then receives the requested content objects in the form of: "parc/services/printers/data/<roothash={105}>/S0+payload", etc. Nancy then determines the service records that are different, and transmits a set of interests for the service records that are determined to be different. In this example, Nancy determines that the missing service record is the one corresponding to Marvin, entitled "M-SR" with a serial number of 7 and a corresponding digest of {11}. Nancy transmits an interest of the form "/parc/services/printers/data/M-SR" and receives a content object in return of the form "/parc/services/printers/data/<payload, (M-SR)>." At time T9, Nancy inserts the service record "M-SR" into its manifest 760 and generates a new root hash value for manifest 760 based on the hash values of the existing service records indicated in the manifest ("L-SR", "M-SR", and "N-SR"). This is depicted by {200}→{420}. However, manifest 760 with a root hash of {420} of device Nancy is not in synchronization with manifest 740 of Larry (and possibly other manifests, such as manifest 780 of Marvin, depicted at time T6 in FIG. 10C) which has a root hash of {105}. Nancy then sends an advertisement of the form "/parc/services/printers/advk-roothash={420}>/<payload, (N-SR)>," and Larry (and Marvin and other devices on the network) receives this advertisement and updates its respective manifest with the service record of Nancy ("N-SR") included as the payload in this advertisement. At time T10, Larry inserts the service record of Nancy, N-SR, with a digest of {65} into manifest 740 and generates the same new root hash value of {420}. This is depicted by {105} {420}. Note that Marvin can also insert N-SR with a digest of {65} into manifest 780, and can also generate the same new root hash value of {420}. Thus, the new device Nancy at node 706 and the existing devices Larry and Marvin at nodes 702 and 704 have synchronized their manifests with each other by using advertisements that contain service records which obviates the need to transfer manifests, and also by using the collection synchronization protocol based on the transfer of manifests described in relation to FIGS. 1-6.

Apparatus and Computer System

Figure 11:
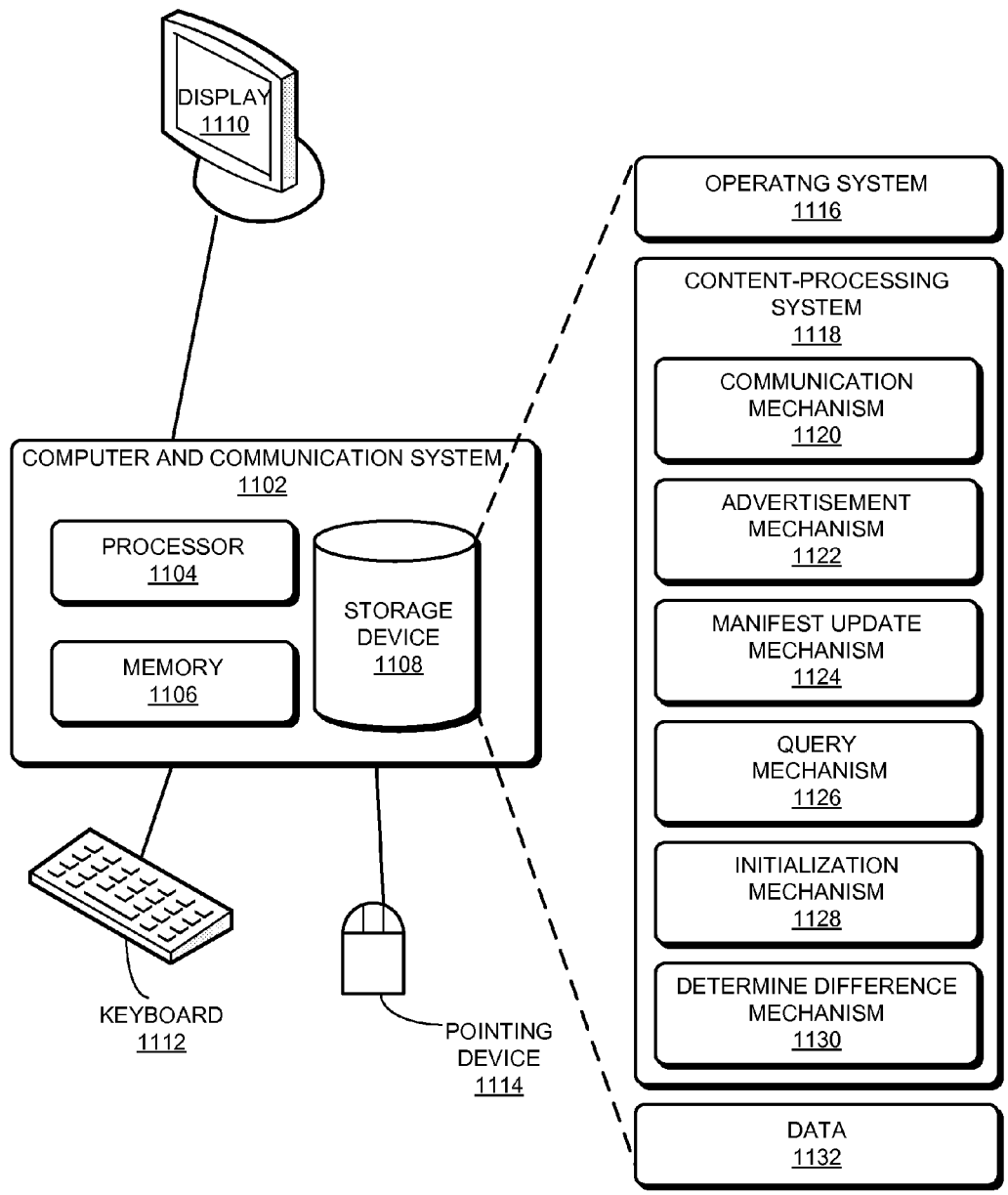
FIG. 11 illustrates an exemplary computer and communication system that facilitates service discovery based on the synchronization of manifests between devices in a content centric network, in accordance with an embodiment of the present invention.

FIG. 11 illustrates an exemplary computer and communication system that facilitates service discovery based on the synchronization of manifests between devices in a content centric network, in accordance with an embodiment of the present invention. Computer and communication system 1102 includes a processor 1104, a memory 1106, and a storage device 1108. Memory 1106 can include a volatile memory (e.g., RAM) that serves as a managed memory, and can be used to store one or more memory pools. Furthermore, computer and communication system 1102 can be coupled to a display device 1110, a keyboard 1112, and a pointing device 1114. Storage device 1108 can store an operating system 1116, a content-processing system 1118, and data 1132.

Content-processing system 1118 can include instructions, which when executed by computer and communication system 1102, can cause computer and communication system 1102 to perform methods and/or processes described in this disclosure. Specifically, content-processing system 1118 may include instructions for receiving an advertisement corresponding to a remote manifest of a remote node, where the advertisement includes a service record corresponding to the remote device (advertisement mechanism 1122). Content-processing system 1118 can also include instructions for transmitting an advertisement corresponding to the local manifest of a local device, where the advertisement includes a service record corresponding to the local device (advertisement mechanism 1122). Content-processing system 1118 can also include instructions for transmitting an advertisement corresponding to an updated local manifest, where the manifest has been updated based on a service record being deleted upon the occurrence of the time to live (TTL) of a service record in the manifest (advertisement mechanism 1122).

Content-processing system 1118 can also include instructions for updating a local manifest of a local device, in response to determining that the local manifest and the remote manifest correspond to the same namespace, by inserting the advertised service record of the remote manifest into the local manifest (manifest update mechanism 1124). Content-processing system 1118 can include instructions for, responsive to determining that the serial number of an advertised service record from a remote device is greater than the serial number of the service record of the same name in a local manifest, updating the value of the service record in the local manifest with the value of the advertised service record from the remote device (manifest update mechanism 1124). Content-processing system 1118 can include instructions for updating the local manifest by deleting the service record from the local manifest, in response to the occurrence of a time to live (TTL) of a service record in the local manifest (manifest update mechanism 1124).

Content-processing system 1118 can further include instructions for transmitting a query for an advertisement corresponding to a remote manifest of a remote device, and for receiving a query from a remote device for an advertisement corresponding to a local manifest, where the advertisements include a service record corresponding to the device (query mechanism 1126).

Content-processing system 1118 can also include instructions for: initializing, by a local device, onto a network; creating a service record corresponding to the local device; and creating a manifest for the local device comprised of the service record (initialization mechanism 1128).

Content-processing system 1118 can include instructions for sending a request for a remote manifest, receiving a remote manifest, sending a request for a content object or service record associated with the remote manifest, and receiving a requested content object or service record associated with the remote manifest (communication mechanism 1120). Content-processing system 718 can also include instructions for sending a set of interests to retrieve a remote manifest, based on a chunking protocol, such that each interest corresponds to a numbered chunk of the manifest (communication mechanism 1120). Content-processing system 1118 can include instructions for transmitting an advertisement corresponding to a manifest, transmitting the manifest to a remote node in response to receiving a request for the manifest, transmitting a requested content object or service record associated with the manifest to a remote node, and receiving a set of interests based on a chunking protocol, such that each interest corresponds to a numbered chunk of the manifest (communication mechanism 1120).

Content-processing system 1118 can further include instructions for determining, based on a received remote manifest, which service records represented in the remote manifest are different from the service records represented in a local manifest (determine difference mechanism 1130).

Data 1132 can include any data that is required as input or that is generated as output by the methods and/or processes described in this disclosure. Specifically, data 1132 can store at least: a manifest that represents a collection of service records; a service record; a name of a service record; a description of the service; a serial number; a time to live (TTL) in seconds; a corresponding digest of the service record; a root hash value of the manifest, which is an additive hash value based on the digests of the service records represented by the manifest; a namespace, or routing prefix, of a manifest, which identifies the manifest; an identifier to determine that a packet corresponds to an advertisement of data; an identifier to determine that a packet corresponds to a transfer of data; a number corresponding to a numbered chunk of the manifest based on a chunking protocol.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a local device, a first advertisement corresponding to a remote manifest of a remote device, wherein the first advertisement includes a service record corresponding to the remote device,
   wherein the service record is a content object with a name that is a hierarchically structured variable length identifier that includes contiguous name components ordered from a most general level to a most specific level,
   wherein receiving the first advertisement is in response to transmitting, by the remote device, the first advertisement; and
   in response to determining that a local manifest of the local device and the remote manifest correspond to a same name prefix, wherein a name prefix includes one or more contiguous name components ordered from a most general level to a most specific level and beginning from the most general level, updating the local manifest by inserting the service record of the first advertisement into the local manifest,
   wherein updating the local manifest allows other devices on a same network as the local device to discover the local device and services offered by the local device, and further allows the other devices to synchronize their respective manifests with the local manifest.

2. The method of claim 1, further comprising:
   transmitting a query for a second advertisement corresponding to a remote manifest of a remote device.

3. The method of claim 1, further comprising:
   transmitting a second advertisement corresponding to the local manifest of the local device, wherein the second advertisement includes a service record corresponding to the local device.

4. The method of claim 1, further comprising:
   receiving a query from a remote device for a second advertisement corresponding to the local manifest, wherein the second advertisement includes a service record corresponding to the local device.

5. The method of claim 1, wherein a packet sent or received by the local device indicates one or more of:
   a routable prefix that identifies the manifest;
   an identifier to determine that the packet corresponds to a transfer of data;
   an identifier to determine that the packet corresponds to an advertisement of data;
   a root hash value of the manifest;
   a name of a service record in the manifest; and
   a service record.

6. The method of claim 1, wherein updating the local manifest further comprises:
   responsive to determining that a serial number of the service record of the first advertisement is greater than a serial number of a service record in the local manifest that has a same name as the service record of the first advertisement, updating the value of the service record in the local manifest with the value of the service record of the first advertisement.

7. The method of claim 1, further comprising:
   initializing onto a network, wherein the local device contains no manifest;
   creating a service record corresponding to the local device; and
   creating a manifest for the local device comprised of the service record.

8. The method of claim 7, wherein updating the local manifest further comprises:
   sending a request for the remote manifest in response to determining that a root hash value of the local manifest is different from a root hash value of the advertised remote manifest, wherein a root hash value identifies service records of a manifest;
   determining, based on the received remote manifest, which service records represented in the remote manifest are different from the service records represented in the local manifest; and
   transmitting a set of interests for the service records that are different.

9. The method of claim 1, further comprising, responsive to the occurrence of a time to live (TTL) of a service record in the local manifest:
   updating the local manifest by deleting the service record from the local manifest; and
   transmitting a second advertisement corresponding to the updated local manifest.

10. A non-transitory computer-readable storage medium storing instructions that when executed by a computer cause the computer to perform a method, the method comprising:
    receiving, by a local device, a first advertisement corresponding to a remote manifest of a remote device, wherein the first advertisement includes a service record corresponding to the remote device,
    wherein the service record is a content object with a name that is a hierarchically structured variable length identifier that includes contiguous name components ordered from a most general level to a most specific level,
    wherein receiving the first advertisement is in response to transmitting, by the remote device, the first advertisement; and in response to determining that a local manifest of the local device and the remote manifest correspond to a same name prefix, wherein a name prefix includes one or more contiguous name components ordered from a most general level to a most specific level and beginning from the most general level, updating the local manifest by inserting the service record of the first advertisement into the local manifest, wherein updating the local manifest allows other devices on a same network as the local device to discover the local device and services offered by the local device, and further allows the other devices to synchronize their respective manifests with the local manifest.

11. The storage medium of claim 10, wherein the method further comprises:
   transmitting a query for a second advertisement corresponding to a remote manifest of a remote device.

12. The storage medium of claim 10, wherein the method further comprises:
   transmitting a second advertisement corresponding to the local manifest of the local device, wherein the second advertisement includes a service record corresponding to the local device.

13. The storage medium of claim 10, wherein the method further comprises:
   receiving a query from a remote device for a second advertisement corresponding to the local manifest, wherein the second advertisement includes a service record corresponding to the local device.

14. The storage medium of claim 10, wherein a packet sent or received by the local device indicates one or more of:
   a routable prefix that identifies the manifest;
   an identifier to determine that the packet corresponds to a transfer of data;
   an identifier to determine that the packet corresponds to an advertisement of data;
   a root hash value of the manifest;
   a name of a service record in the manifest; and
   a service record.

15. The storage medium of claim 10, wherein updating the local manifest further comprises:
   responsive to determining that a serial number of the service record of the first advertisement is greater than a serial number of a service record in the local manifest that has a same name as the service record of the first advertisement, updating the value of the service record in the local manifest with the value of the service record of the first advertisement.

16. The storage medium of claim 10, wherein the method further comprising:
   initializing onto a network, wherein the local device contains no manifest;
   creating a service record corresponding to the local device; and
   creating a manifest for the local device comprised of the service record.

17. The storage medium of claim 16, wherein updating the local manifest further comprises:
   sending a request for the remote manifest in response to determining that a root hash value of the local manifest is different from a root hash value of the advertised remote manifest, wherein a root hash value identifies service records of a manifest;
   determining, based on the received remote manifest, which service records represented in the remote manifest are different from the service records represented in the local manifest; and
   transmitting a set of interests for the service records that are different.

18. The storage medium of claim 10, wherein the method further comprises, responsive to the occurrence of a time to live (TTL) of a service record in the local manifest:
   updating the local manifest by deleting the service record from the local manifest; and
   transmitting a second advertisement corresponding to the updated local manifest.

19. A computer system for facilitating service discovery, comprising:
   a processor;
   a storage device coupled to the processor and storing instructions that when executed by a computer cause the computer to perform a method, the method comprising:
      receiving, by a local device, a first advertisement corresponding to a remote manifest of a remote device, wherein the first advertisement includes a service record corresponding to the remote device, wherein the service record is a content object with a name that is a hierarchically structured variable length identifier that includes contiguous name components ordered from a most general level to a most specific level,
      wherein receiving the first advertisement is in response to transmitting, by the remote device, the first advertisement; and
      in response to determining that a local manifest of the local device and the remote manifest correspond to a same name prefix, wherein a name prefix includes one or more contiguous name components ordered from a most general level to a most specific level and beginning from the most general level, updating the local manifest by inserting the service record of the first advertisement into the local manifest,
      wherein updating the local manifest allows other devices on a same network as the local device to discover the local device and services offered by the local device, and further allows the other devices to synchronize their respective manifests with the local manifest.

20. The computer system of claim 19, wherein the method further comprises:
   transmitting a query for a second advertisement corresponding to a remote manifest of a remote device.

21. The computer system of claim 19, wherein the method further comprises:
   transmitting a second advertisement corresponding to the local manifest of the local device, wherein the second advertisement includes a service record corresponding to the local device.

22. The computer system of claim 19, wherein a packet sent or received by the local device indicates one or more of:
   a routable prefix that identifies the manifest;
   an identifier to determine that the packet corresponds to a transfer of data;
   an identifier to determine that the packet corresponds to an advertisement of data;
   a root hash value of the manifest;
   a name of a service record in the manifest; and
   a service record.

23. The computer system of claim 19, wherein updating the local manifest further comprises:
   responsive to determining that a serial number of the service record of the first advertisement is greater than a serial number of a service record in the local manifest that has a same name as the service record of the first advertisement, updating the value of the service record in the local manifest with the value of the service record of the first advertisement.

24. The computer system of claim 19, wherein the method further comprises:
   initializing onto a network, wherein the local device contains no manifest;
   creating a service record corresponding to the local device; and
   creating a manifest for the local device comprised of the service record.

25. The method of claim 19, further comprising, responsive to the occurrence of a time to live (TTL) of a service record in the local manifest:
   updating the local manifest by deleting the service record from the local manifest; and
   transmitting a second advertisement corresponding to the updated local manifest.

* * * * *